United States Patent
Yamagata et al.

(10) Patent No.: US 7,519,655 B2
(45) Date of Patent: Apr. 14, 2009

(54) SERVICE PROVIDING METHOD AND INTEGRATED CIRCUIT

(75) Inventors: Akihiko Yamagata, Kanagawa (JP); Shigeru Arisawa, Tokyo (JP); Kenji Nakada, Kanagawa (JP); Akira Fukada, Tokyo (JP); Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 1307 days.

(21) Appl. No.: 10/333,869

(22) PCT Filed: May 24, 2002

(86) PCT No.: PCT/JP02/05050

§ 371 (c)(1),
(2), (4) Date: Sep. 4, 2003

(87) PCT Pub. No.: WO02/095572

PCT Pub. Date: Nov. 28, 2002

(65) Prior Publication Data

US 2004/0054710 A1  Mar. 18, 2004

(30) Foreign Application Priority Data

May 24, 2001  (JP)  ............................. 2001-156052
May 24, 2001  (JP)  ............................. 2001-156053

(51) Int. Cl.
*G06F 15/16* (2006.01)
*G06F 12/00* (2006.01)

(52) U.S. Cl. .................... 709/203; 709/225

(58) Field of Classification Search ......... 709/217–218, 709/203, 226–230
See application file for complete search history.

(56) References Cited

U.S. PATENT DOCUMENTS

| 6,647,260 | B2 | 11/2003 | Dusse et al. | |
|---|---|---|---|---|
| 2003/0145316 | A1* | 7/2003 | McKinlay et al. | 717/173 |
| 2004/0015953 | A1* | 1/2004 | Vincent | 717/173 |
| 2006/0101455 | A1* | 5/2006 | Mantani | 717/168 |
| 2006/0218403 | A1* | 9/2006 | Sauve et al. | 713/175 |
| 2008/0134297 | A1* | 6/2008 | Clinick et al. | 726/4 |

FOREIGN PATENT DOCUMENTS

| EP | 0 921 487 A2 | 6/1999 |
|---|---|---|
| EP | 1 043 906 A2 | 10/2000 |
| EP | 1 093 097 A2 | 10/2000 |

(Continued)

OTHER PUBLICATIONS

Search Report corresponding to European Patent Application 02728139.3-1238.

*Primary Examiner*—Zarni Maung
(74) *Attorney, Agent, or Firm*—Bell, Boyd & Lloyd LLP

(57) ABSTRACT

An application program relating to a process of an integrated circuit 21 is stored in a virtual integrated circuit 21 storage area server apparatus 13. Following a mutual authentication between the IC 21 and the virtual IC storage area server apparatus 13 through a portable communication function unit 20, the server apparatus 13 executes the application program. Additionally, through the IC 21, the portable communication function unit 20, a wireless communication line 17, and a network 18, communicate with an IC_R/W apparatus 11 and perform a process relating to a service in collaboration with each other.

38 Claims, 23 Drawing Sheets

FOREIGN PATENT DOCUMENTS

| | | |
|---|---|---|
| JP | 11-066430 | 3/1999 |
| JP | 11-250192 | 9/1999 |
| JP | 11250192 A | 9/1999 |
| JP | 11-313374 | 11/1999 |
| JP | 11-316729 | 11/1999 |
| JP | 11313374 A | 11/1999 |
| JP | 2000-358282 | 12/2000 |
| JP | 2000358282 A | 12/2000 |
| JP | 2001-084220 | 3/2001 |
| JP | 2001-0161036 | 3/2001 |
| JP | 2001061036 A | 3/2001 |
| WO | 98/34203 | 8/1998 |
| WO | 98/37524 | 8/1998 |
| WO | 00/42581 | 7/2000 |

* cited by examiner

ID CIRCUIT

BACKGROUND OF THE INVENTION

The present invention relates to an integrated circuit, a communication method and a system for same using a communication apparatus incorporating the integrated circuit, a processing apparatus and a method thereof used by the same.

Recently, an IC (integrated circuit) card or other IC devices are being used to conduct e-commerce.

An integrated circuit of such an IC device has an interface for communicating with a transaction apparatus installed in a store or similar location, a memory for storing an application program defining a process relating to a service performed using a data carrier function and/or an individual authentication function built into a chip of the IC, and a CPU (Central Processing Unit) for executing the program built therein.

However, an application program is stored in the memory built in the IC as explained above. Therefore from the standpoint of miniaturization and reducing costs associated with the IC, there is a problem. The problem is that services performed using a data carrier function and/or an individual authentication function built into a chip of a single IC are limited because there is a limit in the storage capacity of the memory.

SUMMARY OF THE INVENTION

The present invention solves the above problem. An object of the present invention is to provide a communication method and a system for same, a communication apparatus, a processing apparatus and a method thereof capable of providing a variety of services by using a single integrated circuit without limitations on the storage capacity of the memory built into the integrated circuit.

Further, one embodiment of the present invention is to provide an integrated circuit and a communication apparatus capable of providing a variety of services by using a single integrated circuit without limitations on the storage capacity of the memory built into the integrated circuit.

To solve the above-mentioned problem and achieve the above-mentioned objects, a service providing method of a first aspect of the present invention wherein a communication apparatus and a processing apparatus communicate with each other in response to a service use request issued from the communication apparatus to provide a service to a user of the communication apparatus. The service providing method comprising the steps of: performing communication between a server apparatus which stores a program defining a process relating to the service and the communication apparatus to judge if use of the program is permitted or not in response to the service use request; executing the program with the server apparatus when use of the program is permitted; and performing communication between the server apparatus and the processing apparatus through the communication apparatus in response to the execution of the program with the server apparatus to provide the service to the user.

Further, the present invention includes a service providing system including: a communication apparatus; a processing apparatus that transfers data with the communication apparatus and used in a service to a user of the communication apparatus; and a server apparatus that stores a program defining a process relating to the service, wherein the server apparatus and the communication apparatus communicate with each other in response to a service use request issued from the communication apparatus to determine if use of the program is permitted or not. The server apparatus executes the program when use of the program is permitted, and the server apparatus and the processing apparatus communicate with each other through the communication apparatus in response to the execution of the program by the server apparatus to provide the service to the user.

A method of operating the service providing system of a second aspect of the present invention includes the following steps. The communication apparatus issues a service use request. Then, in response to the service use request, the server apparatus and the communication apparatus communicate to determine if use of the program is permitted or not. Next, when the use of the program is permitted, the server apparatus executes the program. Then, in response to the execution of the program by the server apparatus, the server apparatus and the processing apparatus communicate through the communication apparatus to provide the service to a user.

Further, a further embodiment includes a server apparatus which communicates with a communication apparatus and a processing apparatus that transfers data with the communication apparatus and is used in a service to a user. The apparatus includes a storage device for storing a program defining a process relating to a service and a receiving device for receiving a service use request from the communication apparatus. The apparatus also includes an authentication device for authenticating if the service use request is legitimate or not and when the service use request is legitimate, a control device reads a program defining a process relating to the service from the storage device, executing the read program. While communicating with the processing apparatus through the communication apparatus in response to the execution of the program, the apparatus performs a process for providing a service to the user in collaboration with the processing apparatus.

Further, another embodiment provides a communication method performed by a server apparatus to communicate with a communication apparatus and a processing apparatus that transfers data with the communication apparatus and used in a service to a user of the communication apparatus, includes the steps of: authenticating if the service use request is legitimate or not when a service use request is received from the communication apparatus, reading a program defining a process relating to the service from the storing means when it is determined that the service use request is legitimate. The steps further include executing the read program; and while communicating with the processing apparatus through the communication apparatus in response to the execution of the program, performing a process for providing a service to the user in collaboration with the processing apparatus.

A further embodiment provides a communication method which performs communication using a first communication apparatus including an integrated circuit, a communication circuit, and a processing apparatus that transfers data, comprising the steps of: transmitting via the integrated circuit a use request of a program through the communication circuit to a second communication apparatus storing a program defining a process relating to the service and executing the same; executing a program relating to the use request using the second communication apparatus when it is judged that the use request is legitimate; and performing a process relating to the service in collaboration with the processing apparatus and the second communication apparatus while the integrated circuit relays communication between the processing apparatus and the second communication apparatus conducted through the communication circuit, in response to the execution of the program by the second communication apparatus.

In another embodiment, a communication method provides an integrated circuit which transmits a use request of the program through the communication circuit to the second communication apparatus which stores a program defining a process relating to the service and executing the same. Next, when the second communication apparatus judges that the use request is legitimate, it executes a program relating to the use request. Further, while the communication between the processing apparatus and the second communication apparatus conducted through the communication circuit is relayed by the integrated circuit, the processing apparatus and the second communication apparatus perform a process relating to the service in collaboration with each other in response to the execution of the program by the second communication apparatus.

In this embodiment, by having the second communication apparatus execute the program stored therein in response to the use request from the integrated circuit to the second communication apparatus, the second communication apparatus is enabled to communicate with the processing apparatus through the integrated circuit and perform a service in collaboration with each other wherein the service is provided using the integrated circuit.

Therefore, the program does not have to be stored in the integrated circuit and enables a variety of services to be provided using an integrated circuit with a limited storage capacity. Further, when the second communication apparatus judges that the use request is legitimate in response to a use request from the integrated circuit, the integrated circuit relays the communication between the processing apparatus and the second communication apparatus, thereby, preventing illicit access.

Furthermore in this embodiment, the method includes a step of storing the program relating to the first communication apparatus in a storage area allocated before the first communication apparatus among storage areas in the second communication apparatus.

Further, the method also includes a step of transmitting the use request using the first communication apparatus to the second communication apparatus to indicate use of the storage area allocated before the first communication apparatus.

Furthermore, the communication method further includes the steps of: transmitting, from the first communication apparatus to the second communication apparatus, a program select instruction specifying a program to be selected and used after the integrated circuit transmits the use request to the second communication apparatus; and reading and executing the program specified by the program select instruction.

Further, the first communication apparatus is a portable communication apparatus, the communication circuit is a wireless communication circuit performing communication using a wireless communication network, the second communication apparatus is connected to a network, and the integrated circuit communicates with the second communication apparatus through the communication circuit, the wireless communication network, and the network.

In a further embodiment, a communication system includes a first communication apparatus having an integrated circuit and a communication circuit; a processing apparatus that transfers data with the integrated circuit and used in a service relating to the integrated circuit; and a second communication apparatus that stores a program defining a process relating to the service and executes the same, wherein the integrated circuit transmits the program use request through the communication circuit to the second communication apparatus. The second communication apparatus executes a program relating to the use request after it has been judged that the use request is legitimate. While the integrated circuit relays communication between the processing apparatus and the second communication apparatus conducted through the communication circuit, the processing apparatus and the second communication apparatus perform a process relating to the service in collaboration with each other in response to the execution of the program by the second communication apparatus.

In another embodiment, a communication apparatus communicates with another communication apparatus including an integrated circuit and a communication circuit, and a processing apparatus that transfers data with the integrated circuit and used in a service relating to the integrated circuit. The communication apparatus includes a storing means for storing a program defining a process relating to the service; a receiving means for receiving a program use request from the integrated circuit through the communication circuit and an authentication means for authenticating if the use request is legitimate or not. The apparatus also includes a controlling means for reading a program defining a process relating to the service from the storing means when it is judged that the use request is legitimate, executing the read program, and while communicating with the processing apparatus through the communication circuit and the integrated circuit in response to the execution of the program, performing a process relating to the service in collaboration with the processing apparatus.

In another embodiment, a communication method wherein a communication apparatus including an integrated circuit and a communication circuit communicates with a processing apparatus that transfers data with the integrated circuit and used in a service relating to the integrated circuit, includes the steps of: receiving a use request of a program from the integrated circuit through the communication circuit; reading an application program relating to the use request from a storing means; executing the read program; and while communicating with the processing apparatus through the communication circuit and the integrated circuit in response to the execution of the program, performing a process relating to the service in collaboration with the processing apparatus.

In a further embodiment, a processing apparatus transfers data with a first communication apparatus used in a service provided to a user of the first communication apparatus. After a second communication apparatus and the first communication apparatus have authenticated one another's legitimacy by a mutual authentication conducted through the communication circuit, the processing apparatus, while communicating with the second communication apparatus through the first communication apparatus, performs a process relating to the service in collaboration with the second communication apparatus.

In another embodiment, an integrated circuit access apparatus transfers data between an integrated circuit built into a first communication apparatus and a processing apparatus used in a service provided to a user of the first communication apparatus. After a second communication apparatus and the first communication apparatus have authenticated one another's legitimacy by a mutual authentication conducted through the communication circuit, the integrated circuit access apparatus transfers data between the integrated circuit and the processing apparatus to relay communication between the second communication apparatus and the processing apparatus performed through the integrated circuit.

In a further embodiment, there is provided a processing method which includes transferring data with a first communication apparatus including an integrated circuit and a communication circuit and used in a service relating to the integrated circuit, including the steps of: conducting mutual authentication between a second communication apparatus storing a program defining a process relating to the service and executing the same, and the integrated circuit through the communication circuit, and after one another's legitimacy is authenticated by the mutual authentication; relaying the integrated circuit; and while communicating with the second communication apparatus executing the program, performs a process relating to the service in collaboration with the second communication apparatus.

In another embodiment, there is provided a communication method performing communication using a first communication apparatus including an integrated circuit and a communication circuit, a second communication circuit used in a service relating to the integrated circuit, and a third communication apparatus storing a program defining a process relating to the integrated circuit and executing the same, including the steps of: transmitting a use request of the program from the integrated circuit to the third communication apparatus through the communication circuit; conducting mutual authentication between the integrated circuit and the third communication apparatus through said communication circuit; and conducting mutual authentication between the second communication apparatus and the third communication apparatus when the legitimacy of the integrated circuit and the third communication apparatus has been authenticated by the mutual authentication thereof, and when the second communication apparatus and the third communication apparatus have authenticated one another's legitimacy by the mutual authentication, executing by the third communication apparatus the program relating to the use request, whereby the second communication apparatus and the third communication apparatus communicate to perform a process relating to the service in collaboration with each other in response to the execution of the program.

In another embodiment, a use request of the program is transmitted through the communication circuit from the integrated circuit to the third communication apparatus. Next, mutual authentication is conducted between the integrated circuit and the third communication apparatus through the communication circuit. Then, if the integrated circuit and the third communication apparatus have authenticated one another's legitimacy by the mutual authentication, mutual authentication is conducted between the second communication apparatus and the third communication apparatus. If the second communication apparatus and the third communication apparatus have authenticated one another's by the mutual authentication, the third communication apparatus executes the program relating to the use request. In response to the execution of the program, the second communication apparatus and the third communication apparatus communicate to perform a process relating to the service in collaboration with each other.

In this embodiment, the necessity of storing a program in the integrated circuit is no longer required, and therefore a variety of services can be provided using an integrated circuit with a limited storage capacity. Further, since mutual authentication is conducted between the integrated circuit and the third communication apparatus and between the second communication apparatus and the third communication apparatus, illicit access can be prevented.

Further, in this embodiment, the communication method of the present invention, preferably, further includes the steps of: transmitting from the second communication apparatus to the first communication apparatus a program select instruction for instructing a program to be selected and used; transmitting by the first communication apparatus on the basis of the program select instruction a program select instruction to the third communication instruction; and executing by the third communication apparatus a program specified by the program select instruction received from the first communication apparatus.

In a further embodiment, a communication system includes: a first communication apparatus including an integrated circuit and a communication circuit; a second communication apparatus used in a service relating to the integrated circuit; and a third communication apparatus storing a program defining a process relating to the service and executing the same. A use request of the program is transmitted from the integrated circuit to the third communication apparatus through the communication circuit. Then, mutual authentication is conducted between the integrated circuit and the third communication apparatus through the communication circuit; when the integrated circuit and the third communication apparatus have authenticated one another's legitimacy by the mutual authentication, the second communication apparatus and the third communication apparatus conduct mutual authentication; and when the second communication apparatus and the third communication apparatus have authenticated one another's legitimacy by the mutual authentication, the third communication apparatus executes the program relating to the use request, and the second communication apparatus and the third communication apparatus communicate in response to the execution of the program to perform a process relating to the service in collaboration with each other.

In a further embodiment, a communication apparatus of the present invention communicates with a first communication apparatus including an integrated circuit and a communication circuit, and a second communication apparatus storing a program defining a process relating to a service and used in a service relating to the integrated circuit. The communication apparatus includes an authentication device for authenticating with the second communication apparatus after the integrated circuit and the second communication apparatus have authenticated one another's legitimacy by a mutual authentication; and a controlling device for communicating with the second communication apparatus executing the program to perform a process relating to the service in collaboration with each other after one another's legitimacy with the second communication apparatus has been authenticated by a mutual authentication through the authentication device.

In another embodiment, there is provided a communication method of the present invention performed between a first communication apparatus including an integrated circuit and a communication circuit, and a second communication apparatus storing a program defining a process relating to a service to be provided using the integrated circuit and executing the same. The communication method includes the steps of: conducting mutual authentication with the second communication apparatus after the integrated circuit and the second communication apparatus have authenticated one another's legitimacy by a mutual authentication; and communicating with the second communication apparatus executing the program to perform a process relating to the service in collaboration with each other after one another's legitimacy with the second communication apparatus has been authenticated by the mutual authentication with the second communication apparatus.

In a further embodiment, a communication apparatus of the present invention communicates with a first communication apparatus including an integrated circuit and a communication circuit, and a second communication apparatus used in a service relating to the integrated circuit. The communication apparatus includes a storing device for storing a program defining a process relating to the service; a receiving device for receiving a use request of the program from the integrated circuit through the communication circuit; an authentication device for conducting mutual authentication with the integrated circuit through the communication circuit in response to the use request and after one another's legitimacy has been authenticated by the mutual authentication, conducting mutual authentication with the second communication apparatus; and when one another's legitimacy with the second communication apparatus has been authenticated by the mutual authentication, a controlling device for reading the program relating to the use request from the storing means and executing the same, and communicating with the second communication apparatus in response to the execution of the program to perform a process relating to the service in collaboration with each other.

In another embodiment, there is provided a communication method of the present invention wherein a first communication apparatus includes an integrated circuit and a communication circuit, and a second communication apparatus used in a service relating to the integrated circuit communicates. The method includes the steps of: receiving a use request of a program defining a process relating to the service from the integrated circuit through the communication circuit; conducting mutual authentication with the integrated circuit through the communication circuit in response to the use request, and after one another's legitimacy has been authenticated by the mutual authentication, conducting mutual authentication with the second communication apparatus; reading a program relating to the use request from a storage device and executing the same when one another's legitimacy with the second communication apparatus has been authenticated by the mutual authentication; and communicating with the second communication apparatus in response to the execution of the program to perform a process relating to the service in collaboration with each other.

In a further embodiment, there is provided an integrated circuit of the present invention which transfers data with a communication circuit of a first communication apparatus and a processing apparatus performing a process relating to a predetermined service. The integrated circuit includes a first interface for transferring data with the processing apparatus; a second interface for transferring data with the communication circuit; and a controlling device for accessing a second communication apparatus through the second interface and the communication circuit, and while communicating with the processing apparatus through the first interface, performs a process relating to the service using a program or data stored in the second communication apparatus.

An operation of the integrated circuit of this embodiment is as follows:

The controlling means accesses the second communication apparatus through the second interface and the communication circuit under a predetermined condition. Then, the controlling device performs a process while communicating with the processing apparatus through the first interface using a program or data stored in the second communication apparatus. In this manner, the second communication apparatus can be used as a virtual memory and as an apparatus to virtually execute a program.

Further, in this embodiment, preferably, when the second communication apparatus stores a program defining a process relating to the service and executes the same, the controlling device conducts mutual authentication with the second communication apparatus through the second interface and the communication circuit, and then controls communication of the second communication apparatus executing the program and the processing apparatus conducted through the communication circuit so that the first interface and the second interface relays the same.

Further, in this embodiment, preferably, the controlling device communicates with the second communication apparatus through the second interface and the communication circuit to conduct the mutual authentication based on an authentication request received from the second communication through the communication circuit.

Further, the integrated circuit preferably, further includes a storage circuit for storing a program relating to a service provided using the integrated circuit, wherein the controlling device judges or determines if the program corresponding to a request received from the processing apparatus through the first interface is stored in the storage circuit or not, and when judged that the program is stored in the storage circuit, executes the program read from the storage circuit, and while communicating with the processing apparatus through the first interface in response to the execution of the program, performs a process relating to the service.

Furthermore, preferably, when the controlling means judges that the program is not stored in the storage circuit, it transmits a use request of the program to the second communication apparatus through the second interface and the communication circuit.

In another embodiment, an electronic circuit has a communication device and an integrated circuit mounted on a substrate. The integrated circuit includes a first interface transferring data with a processing apparatus performing a process relating to a predetermined service; a second interface transferring data with the communication device; and a controlling device for accessing a second communication apparatus through the second interface and the communication circuit, and while communicating with the processing apparatus through the first interface, performs a process using a program or data stored in the second communication apparatus.

In a further embodiment, a communication apparatus includes a communication circuit and an integrated circuit. The integrated circuit includes a first interface for transferring data with a processing apparatus performing a process relating to a predetermined service; a second interface for transferring data with the communication circuit; and a controlling device for accessing another communication apparatus through the second interface and the communication circuit, and while communicating with the processing apparatus through the first interface, performs a process using a program or data stored in the another communication apparatus.

Further, in another embodiment of the communication apparatus the communication circuit preferably includes a storage circuit for storing a program or data, and the controlling device accesses the storage circuit through the second interface, and performs a process while communicating with the processing apparatus through the first interface using a program or data stored in the storage circuit.

Further, in a further embodiment, there is provided an integrated circuit which transfers data with a communication circuit of a first communication apparatus. The integrated circuit includes an interface for communicating with the communication circuit; and a controlling device for conducting mutual authentication with a second communication apparatus through the interface and the communication circuit if an authentication request from the communication circuit is received through the interface.

Further, in this embodiment, a result of the mutual authentication is used for determining whether the second communication apparatus and a third communication apparatus for performing a process relating to a service using the integrated circuit should communicate to perform a process relating to the service or not.

Further, the integrated circuit further includes a storage circuit for storing a program relating to a service provided using the integrated circuit, wherein the controlling device judges if the program corresponding to a request received from the communication circuit through the interface is stored in the storage circuit or not, and when judged that the program is stored in the storage circuit, executes the program read from the storage circuit and while communicating with the third communication apparatus through the interface and the communication circuit in response to the execution of the program, performs a process relating to the service.

Further, when the controlling device judges that the program is not stored in the storage circuit, the integrated circuit transmits a use request of the program to the second communication apparatus through the interface and the communication circuit.

Further, in another embodiment, the communication apparatus includes a communication circuit and an integrated circuit, wherein the integrated circuit includes an interface for transferring data the communication circuit; and a controlling device for conducting mutual authentication with another communication apparatus through the interface and the communication circuit if an authentication request from the communication circuit is received through the interface.

Additional features and advantages of the present invention are described in, and will be apparent from, the following Detailed Description of the Invention and the Figures.

DETAILED DESCRIPTION OF THE INVENTION

Hereinafter, a communication system according to an embodiment of the present invention will be explained.

Figure 1:
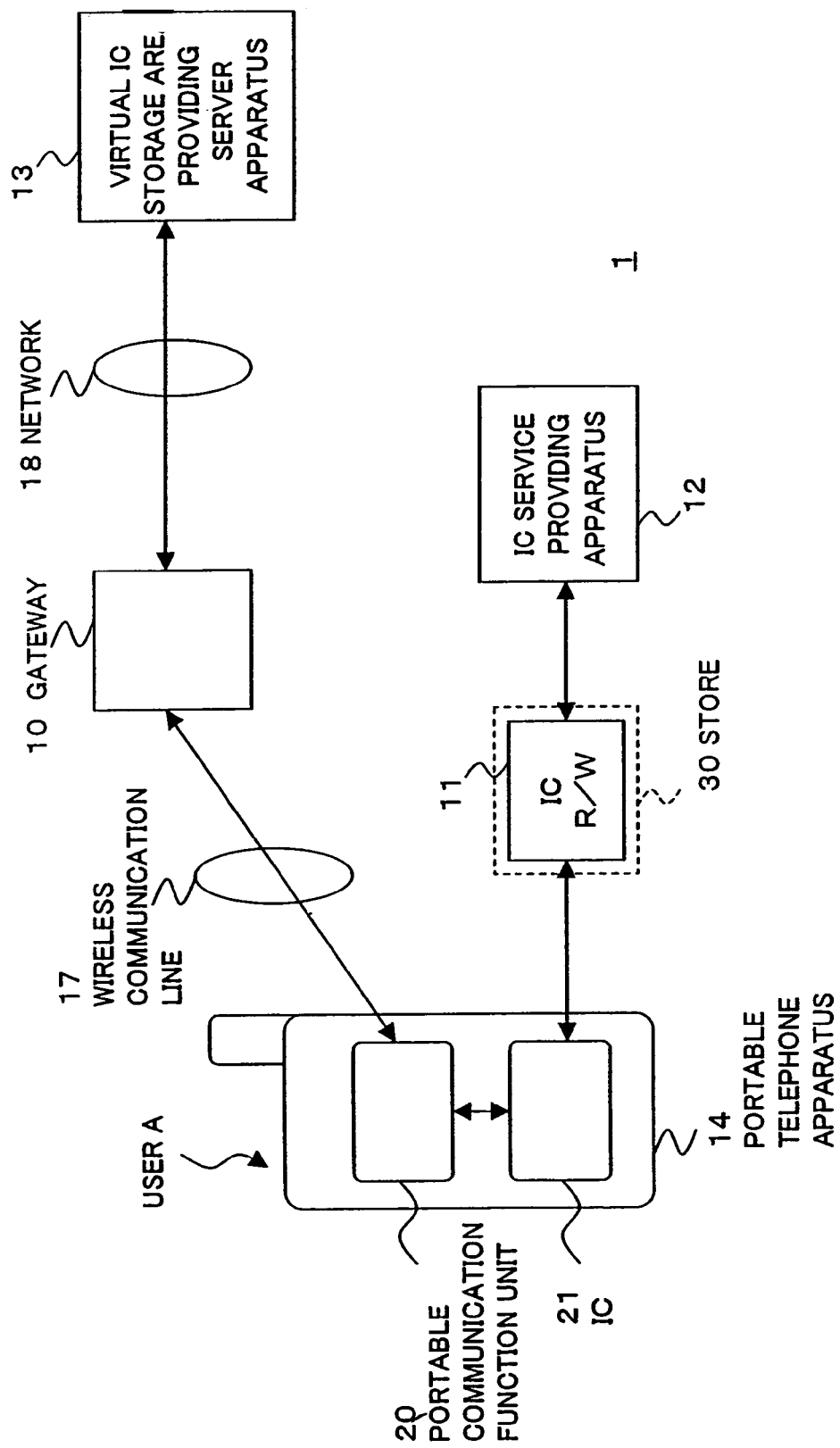
FIG. 1 is a schematic diagram of the overall configuration of a communication system of an embodiment of the present invention.

FIG. 1 is a view of the overall configuration of a communication system 1 of the present invention.

As shown in FIG. 1, the communication system 1 comprises, for example, a gateway 10, an IC_R/W apparatus 11, an IC service providing apparatus 12, a virtual IC storage area server apparatus 13, and a portable telephone apparatus 14.

The portable telephone apparatus 14 and the virtual IC storage area server apparatus 13 communicate through the wireless communication line 17 or other portable telephone communication network, the gateway 10, and a network 18 such as the Internet. Or, communicate by directly connecting to the gateway 10 which manages the wireless communication line 17. Further, the portable telephone apparatus 14 and the IC_R/W apparatus 11 conduct, for example, wireless communication. In addition, the IC_R/W apparatus 11 and the IC service providing apparatus 12 communicates through, for example, an exclusive transmission line. Also, the portable telephone apparatus 14 comprises a portable communication function unit 20 and an IC 21.

Figure 2:
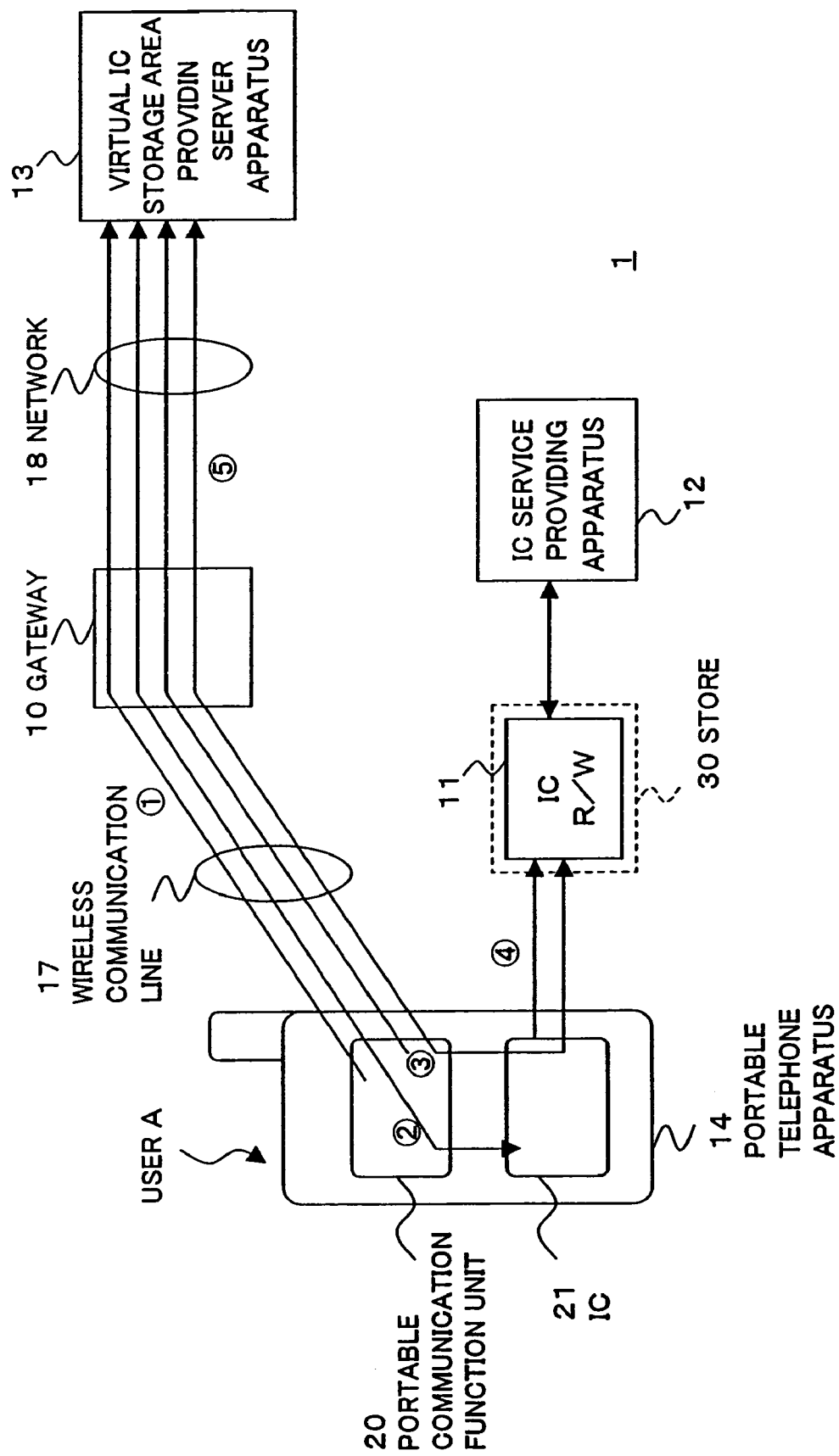
FIG. 2 is a schematic diagram explaining the outline of an example of an operation of the communication system shown in FIG. 1.

First, an outline of an example of the operation of the communication system 1 shown in FIG. 1 will be explained. FIG. 2 is a view for explaining the outline of the example of the operation of the communication system 1 shown in FIG. 1.

A user A visits a store 30, and the IC_R/W apparatus 11 and the IC 21 are enabled into a wireless communication state via an antenna of the IC 21. In this case, data is transferred and power is supplied between the IC_R/W apparatus 11 and the IC 21 through the antenna, whereby a stabilized direct current voltage is supplied to each of the circuits inside the IC 21. In another embodiment, the IC_R/W apparatus 11 and the IC 21 are enabled into a wireless communication state by a power source from a battery inside the portable telephone apparatus 14.

Then, as shown in FIG. 2, in response to an operation of the portable communication function 20 of the portable telephone apparatus 14 by the user A, a virtual storage area use demand (service use demand of the present invention or a use demand) is transmitted to the virtual IC storage area server apparatus 13 through the wireless communication line 17, the gateway 10, and the network 18 from the portable communication function unit 20 (① in FIG. 2).

Next, mutual authentication is conducted between the IC 21 of the portable telephone apparatus 14 and the virtual IC storage area server apparatus 13 (② in FIG. 2). Then, when each other's legitimacy is authenticated by mutual authentication, along with transmitting an application program selection instruction to the virtual IC storage area server apparatus 13 from the portable communication function unit 20 (③ in FIG. 2) in response to an operation of the user A, a virtual storage area use instruction is transmitted to the IC_R/W apparatus 11 from the IC 21 (⑤ in FIG. 2).

Figure 20:
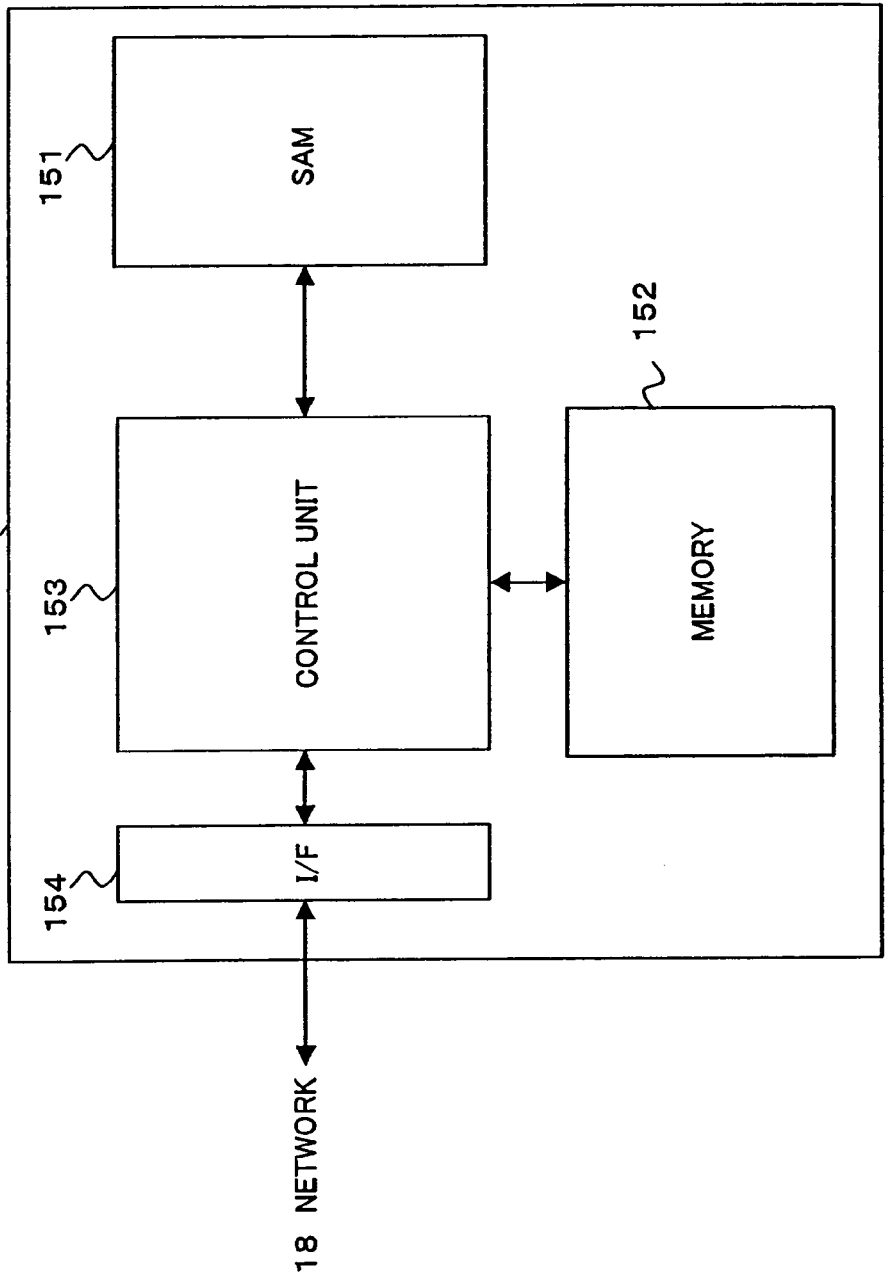
FIG. 20 is a block diagram of a virtual IC storage area server apparatus shown in FIG. 18.

Next, the IC_R/W apparatus 11 and the virtual IC storage area server apparatus 13 communicate through the portable communication function unit 20 and the IC 21, and after conducting mutual authentication, perform in collaboration with each other a process relating to a service performed using a data carrier function and/or an individual authentication function built into a chip of the IC 21 (⑤ in FIG. 20).

In this manner, according to the communication system 1, when the IC 21 performs a process relating to a service with the IC_R/W apparatus 11, the virtual IC storage area server apparatus 13 executes an application program stored in the server apparatus 13 after a predetermined authentication process, and performs a process relating to the above service while communicating with the IC_R/W apparatus 11.

Therefore, even if the storage capacity of the memory in the IC 21 is small, it is possible to provide a service using an application program having a large amount of data. It should be appreciated that the service of the present embodiment include services involving highly confidential processes such as membership, electronic money, e-commerce, point accumulation, cash card, and credit card, and services relating to confirming and processing utilization rights of exiting a ticket barrier and entering and exiting.

Below, each of the components of the communication system 1 shown in FIG. 1 will be explained in detail. The gateway 10 is an apparatus for relaying communication between the wireless communication line 17 or other portable telephones and the network 18. The IC_R/W apparatus 11 is installed in the store 30 of a service provider and transfers data with the IC 21 built into the portable telephone apparatus 14 by a contact system or non-contact system to thereby perform a process relating to a service performed using a data carrier function and/or an individual authentication function built into a chip of the IC 21. In the present embodiment, a case of transferring data between the IC_R/W apparatus 11 and the IC 12 by the non-contact system (wireless system) is exemplified.

The IC_R/W apparatus 11, as explained below, communicates with the virtual IC storage area server apparatus 13 which stores and executes an application program defining a process relating to the service through the portable telephone apparatus 14 to perform the process relating to the service in collaboration with the virtual IC storage area server apparatus 13 in response to the application program executed by the virtual IC storage area server apparatus 13.

As the above service of the present embodiment, there are services involving highly confidential processes such as authentication of the person in question (individual), electronic money, e-commerce, and issuance of a ticket.

The IC service providing apparatus 12 transfer data required in the service performed using a data carrier function and/or an individual authentication function built into a chip of the IC 21 with the IC_R/W apparatus 11. It should be appreciated that in the present invention, for example, the IC service providing apparatus 12 may communicate with the virtual IC storage area server apparatus 13 through the IC_R/W apparatus 11 and the portable telephone apparatus 14 to perform the process relating to the service in collaboration with the virtual IC storage area server apparatus 13 in response to the application program executed by the virtual IC storage area server apparatus 13.

In this case, the IC_R/W apparatus 11 transfers data between the IC 21 and the IC service providing apparatus 12 in order to relay communication between the IC service providing apparatus 12 and the virtual IC storage area server apparatus 13. It should be appreciated that the IC_R/W apparatus 11 and the IC service providing apparatus 12 may be configured as independent apparatuses, respectively, or as a single apparatus. The virtual IC storage area server apparatus 13 functions as a virtual memory of the IC 21 of the portable telephone apparatus 14, stores an application program relating to a service performed using a data carrier function and/or an individual authentication function built into a chip of the IC 21, and executes the application program in response to an instruction from the IC 21.

Figure 3:
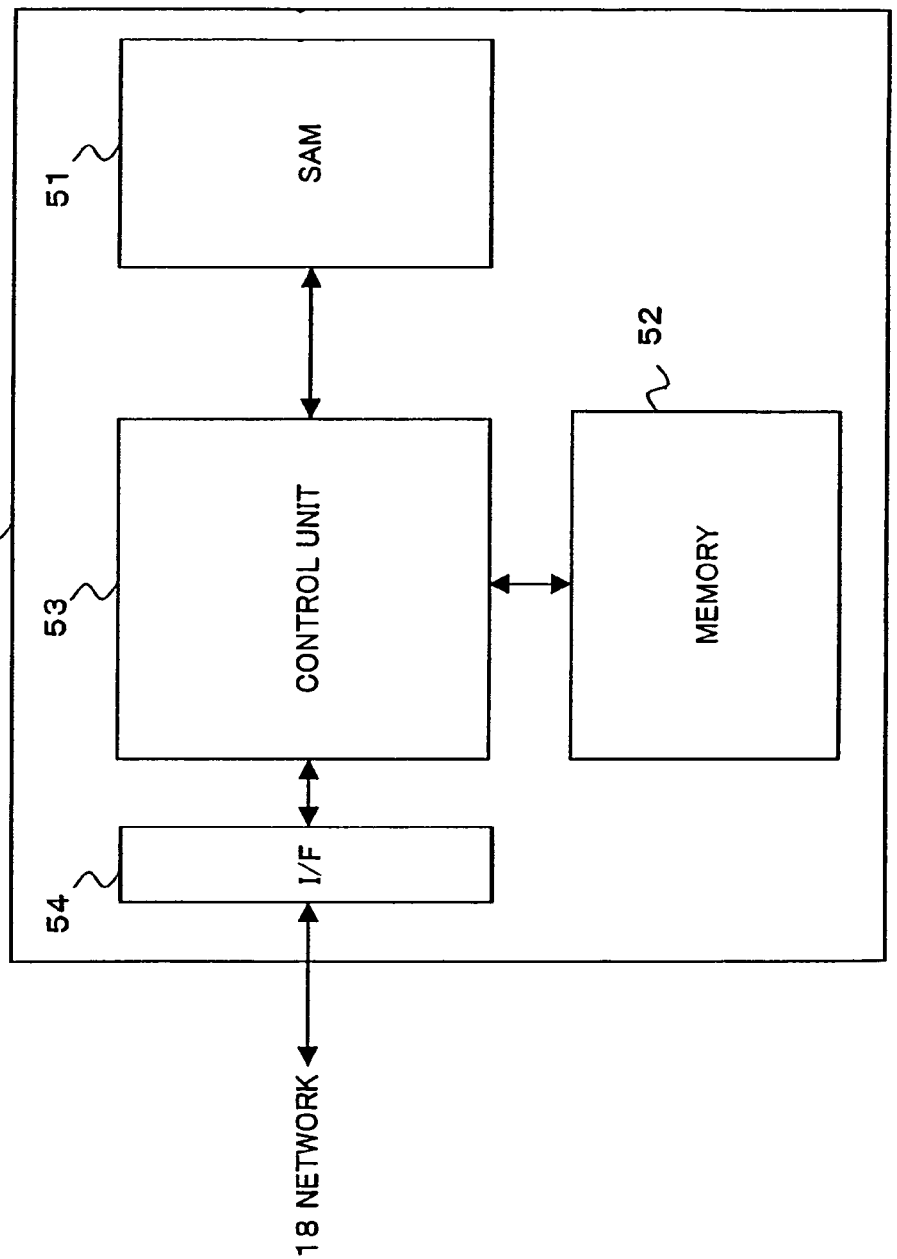
FIG. 3 is a block diagram of the virtual IC storage area server apparatus shown in FIG. 1.

FIG. 3 is a block diagram of the virtual IC storage area server apparatus 13. As shown in FIG. 3, the virtual IC storage area server apparatus 13 comprises, for example, a SAM 51, a memory 52, a control unit 53, and an I/F unit 54.

Figure 4:
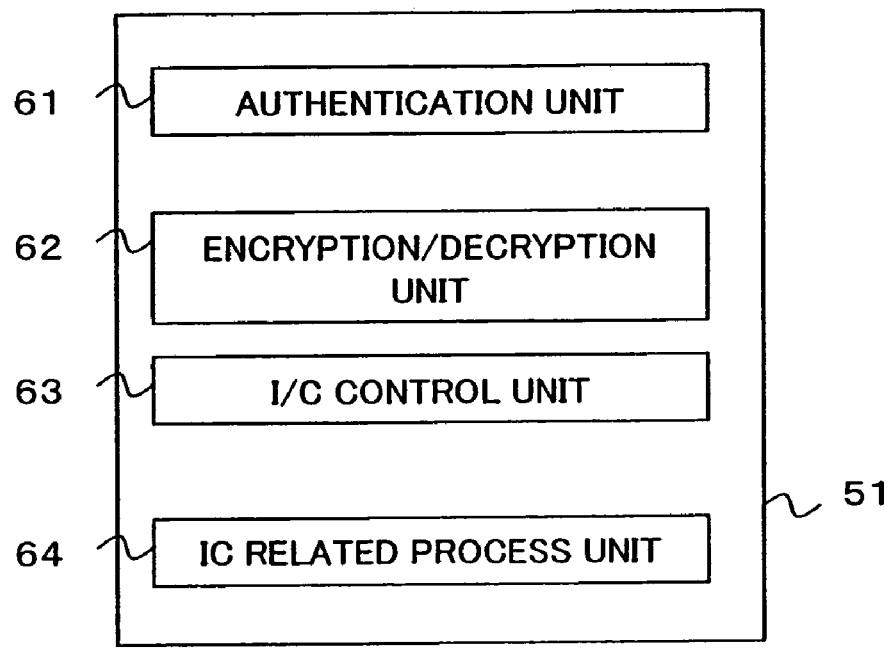
FIG. 4 is a block diagram of the SAM shown in FIG. 3.

FIG. 4 is a block diagram of the SAM 51 shown in FIG. 3. The SAM 51 is a tamper-resistant module of a hardware or software. The SAM 51 includes an authentication unit 61, an encryption/decryption unit 62, an IC control unit 63, and an IC related process unit 64. The authentication unit 61 conducts mutual authentication with the IC 21 and mutual authentication with the IC_R/W apparatus 11. The encryption/decryption unit 62 performs, for example, encryption of an application program to be registered (write) into the memory 52, and decryption of an application program read from the memory 52. The IC control unit 63 controls, for example, communication with the IC 21. The IC related process unit 64 performs a process relating to a predetermined service in collaboration with the IC 21. The memory 52 is used as the virtual memory of the IC 21 to store an application program relating to a service performed using a data carrier function and/or an individual authentication function built into a chip of the IC 21.

Figure 5:
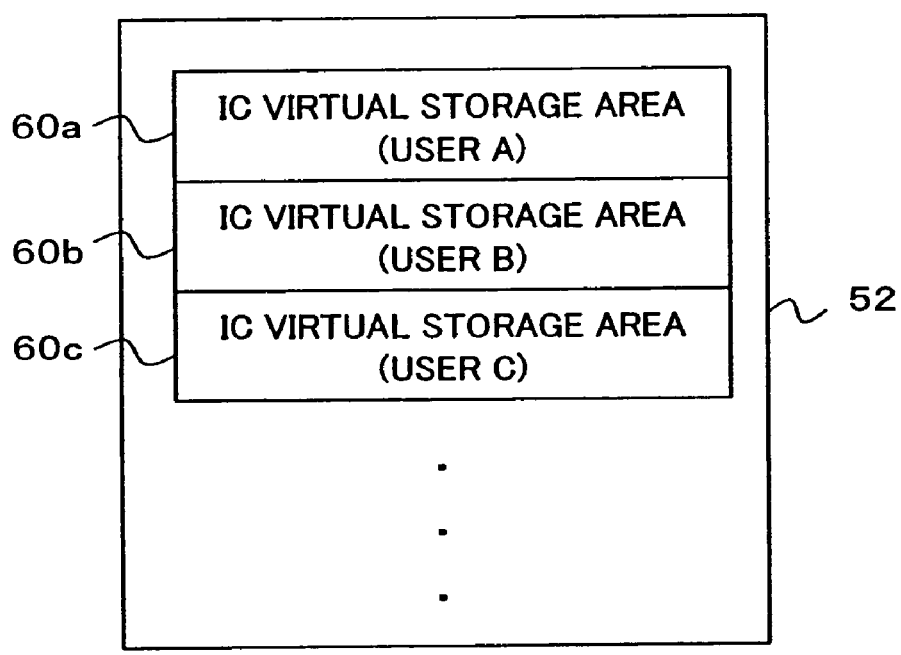
FIG. 5 is a block diagram explaining a memory storage area shown in FIG. 3.

The memory 52, as shown in FIG. 5, comprises IC virtual storage areas 60a, 60b, 60c . . . allocated to every user (portable telephone apparatus) in advance by a registration process which will be explained later. For example, the IC virtual storage area 60a is allocated to the user A of the portable telephone apparatus 14, the IC virtual storage area 60b is allocated to a user B, and the IC virtual storage area 60c is allocated to a user C.

Figure 6:
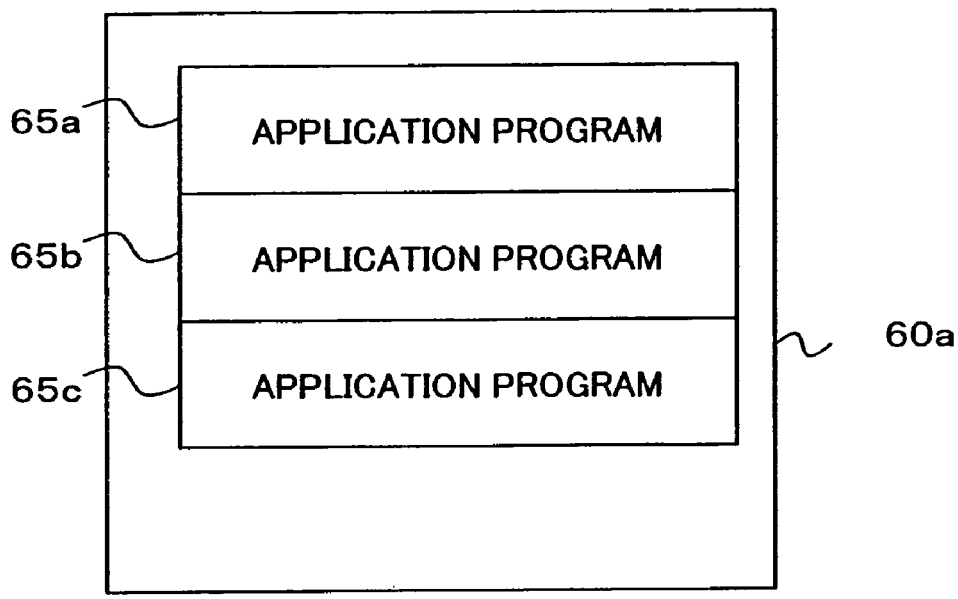
FIG. 6 is a block diagram explaining an application program stored in the IC virtual storage area shown in FIG. 5.

Further, for example as shown in FIG. 6, application programs 65a, 65b, and 65c registered by an application program registering process which will be explained below are stored in the IC virtual storage area 60a. The application programs 65a, 65b, and 65c respectively are programs defining processes relating to services provided using the IC 21. The memory 52 has a storage capacity of, for example, 2 k, 4 k, or 8 k. The control unit 53 integrates the processes of the virtual IC storage area server apparatus 13 to control the same.

Figure 7:
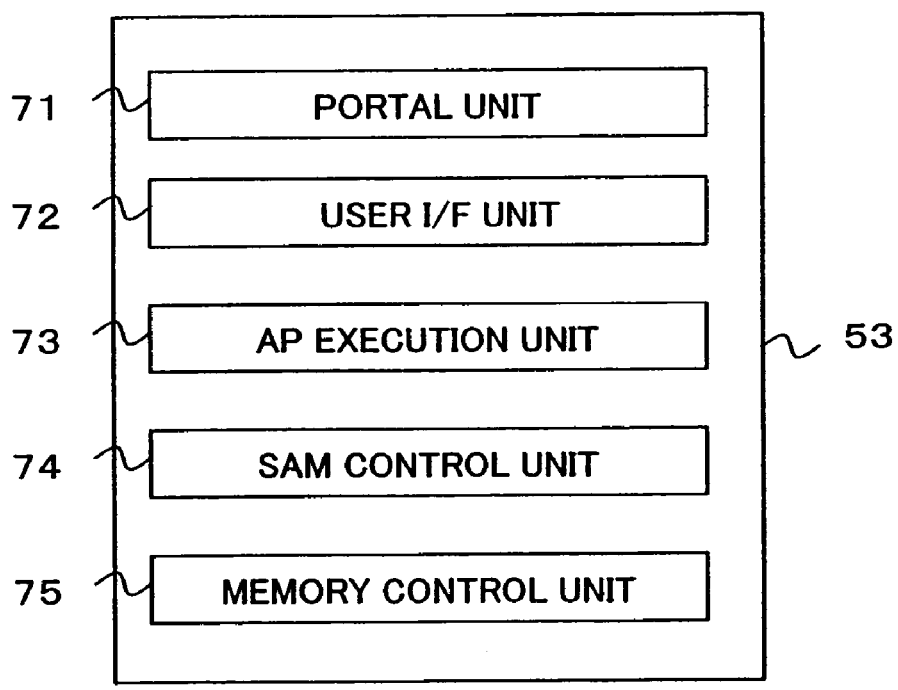
FIG. 7 is a block diagram of the control unit shown in FIG. 4.

FIG. 7 is a block diagram of the control unit 53. As shown in FIG. 7, the control unit 53 includes a portal unit 71, a user I/F unit 72, an AP (application program) execution unit 73, a SAM control unit 74, and a memory control unit 75.

The portal unit 71 realizes a portal function in response to, for example, an access from the portable telephone apparatus 14. For example, it displays a menu screen of providable services on a display portion of the portable telephone apparatus 14.

The user I/F unit 72 controls a user I/F screen to be displayed on a display unit 34 of the portable telephone apparatus 14. The AP execution unit 73 executes an application program read from the memory 52. The SAM control unit 74 controls a process using the SAM 51. The memory control unit 75 manages an application program stored in the memory 52. Specifically, the memory control unit 75 for example allocates the IC virtual storage area 60a to the portable telephone apparatus 14 and registers the application programs 65a, 65b, and 65c to the IC virtual storage area 60a.

As shown in FIG. 1, the portable telephone apparatus 14 includes the portable communication function unit 20 and the IC 21. Here, the portable communication function unit 20 corresponds to the communication circuit of the present invention, and the IC 21 corresponds to the integrated circuit of the present invention. It should be appreciated that that the portable telephone apparatus 14 including the portable communication function unit 20 and the IC 21 is exemplified in the present embodiment, however, for example, an IC chip module (electronic circuit of the 19th aspect of the present invention) having the IC 21, the antenna, and a communication circuit (communication means of the present invention) mounted on a substrate can be used. In this case, communication with the virtual IC storage area server apparatus 13 is conducted using the antenna and the communication circuit.

Figure 8:
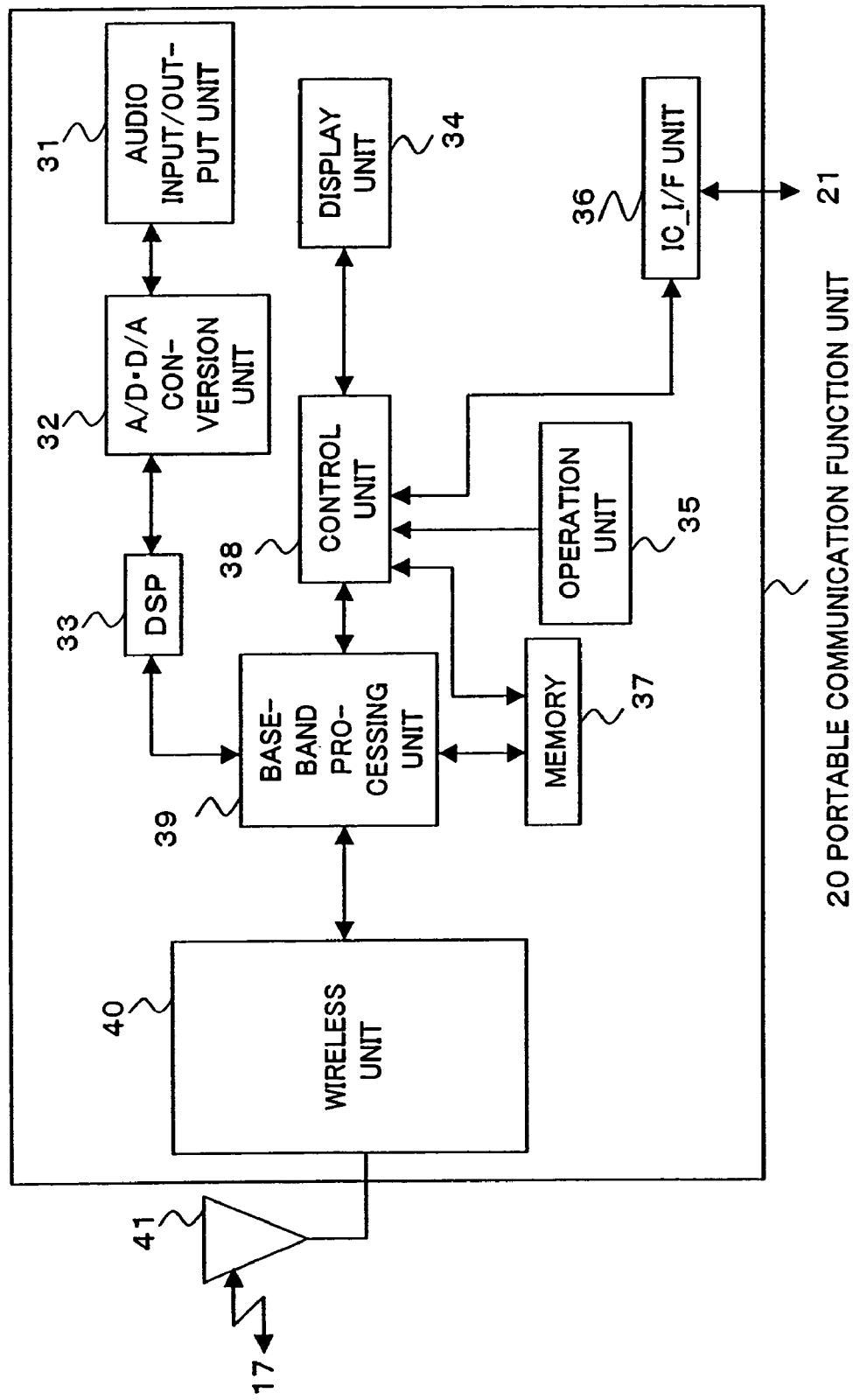
FIG. 8 is a block diagram of a portable communication function unit of the portable telephone apparatus shown in FIG. 1.

FIG. 8 is a block diagram of the portable communication function unit 20 shown in FIG. 1. As shown in FIG. 8, the portable communication function 20 comprises, for example, an audio input/output unit 31, an A/D-D/A conversion unit 32, a DSP 33, a display unit 34, an operation unit 35, an IC_I/F unit 36, a memory 37, a base band processing unit 39, and a wireless unit 40.

The audio input/output unit 31 comprises a speaker for outputting voices/sounds in response to an analog audio signal inputted from the A/D·D/A conversion unit 32, and a mike for outputting an analog audio signal generated in response to the inputted voice/sound to the A/D·D/A conversion unit 32.

The A/D·D/A conversion unit 32 converts a digital audio signal inputted from the DSP 33 into an analog audio signal to thereby output it to the audio input/output unit 31.

Further, the A/D·D/A conversion unit 32 converts an analog audio signal inputted from the audio input/output unit 31 into to a digital audio signal thereby output it to the DSP 33. The DSP 33 performs a band compression process of a digital audio signal.

The display unit 34 displays an image in response to an image signal inputted from the control unit 38, for example, a liquid crystal display.

The operation unit 35 comprises operating buttons and outputs operation signals to the control unit 38 in response to an operation of the operating buttons by a user.

The IC_I/F unit 36 is a UART (Universal Asynchronons Receiver Transmitter), IC2, USB, IEEE 139 or other interfaces for transferring data with the IC 21 shown in FIG. 1.

The memory 37 stores programs and data required in processes in the control unit 38 and the base band processing unit 39. The memory 37 may be, for example, a memory fixed to the portable communication function unit 20 in a state where it cannot be detached, or may be a memory card or other memories detachable from the portable communication function unit 20. The memory 37 has a storage capacity of, for example, 64 k or IM bytes, etc.

Further, the portable communication function unit 20 stores in the memory 37, for example, a program defining a process using the IC 21, and in response to an instruction from the IC 21, may transmit a program read from the memory 37 by the control unit 38 to a control unit 48 of the IC 21 through the IC_I/F unit 36 and an I/F unit 45. Further, the control unit 48 executes the read program, whereby a process relating to a service may be performed in collaboration with the control unit 38 and the control unit 48 through the IC_I/F unit 36 and the I/F unit 45

Figure 9:
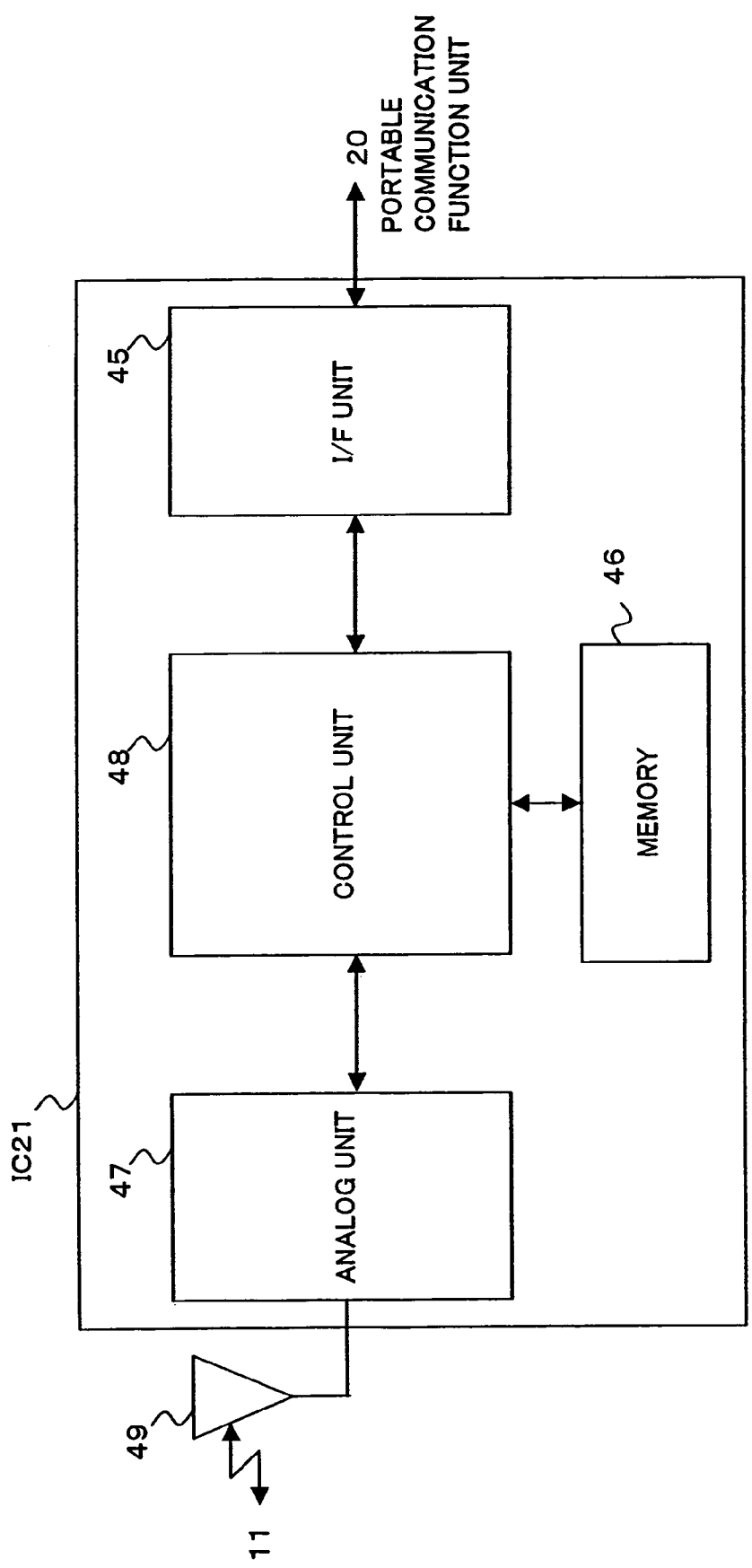
FIG. 9 is a block diagram of an IC of the portable telephone apparatus shown in FIG. 1.

The control unit 38 comprehensively controls the processes of the portable communication function unit 20, and together with being controlled by the control unit 48 shown in FIG. 9, controls the control unit 48.

The base band processing unit 39 performs a base band process. In addition, the wireless unit 40 perform processes such as amplifying and detecting a wave of the data (signal) transferred through the antenna 17 and generating an IQ signal.

The IC 21 is a tamper-resistant integrated circuit capable of preventing illicit monitoring and tampering of data and processes in the IC 21 and data to be transferred with the outside, and performs processes relating to various kinds of services determined in advance to be provided using the IC_R/W apparatus 11 and the IC service providing apparatus 12.

FIG. 9 is a block diagram of the IC 21 shown in FIG. 1. As shown in FIG. 9, the IC 21 comprises, for example, the I/F unit 45, a memory 46, an analog unit 47, and the control unit 48.

The I/F unit 45 is an interface for transferring data with the IC_I/F unit 36 of the portable communication function unit 20 shown FIG. 8 by a wired system or wireless system.

The memory 46 stores data and a program required in a process of the control unit 48. Note that an application program used in a portion of a service of the various services provided by using the IC 21 may be stored in the memory 46.

The analog unit 47 amplifies a data (signal) transferred with the IC_R/W apparatus 11 through the antenna 49 by a wireless system and other analog processes.

The control unit 48 integrates processes of the IC 21 to thereby control the same. The control unit 48 controls the control unit 38 together with being controlled by the control unit 38 of the portable communication function unit 20.

The base band processing unit 39 performs a base band process of a signal transferred with the wireless unit 40.

Figure 10:
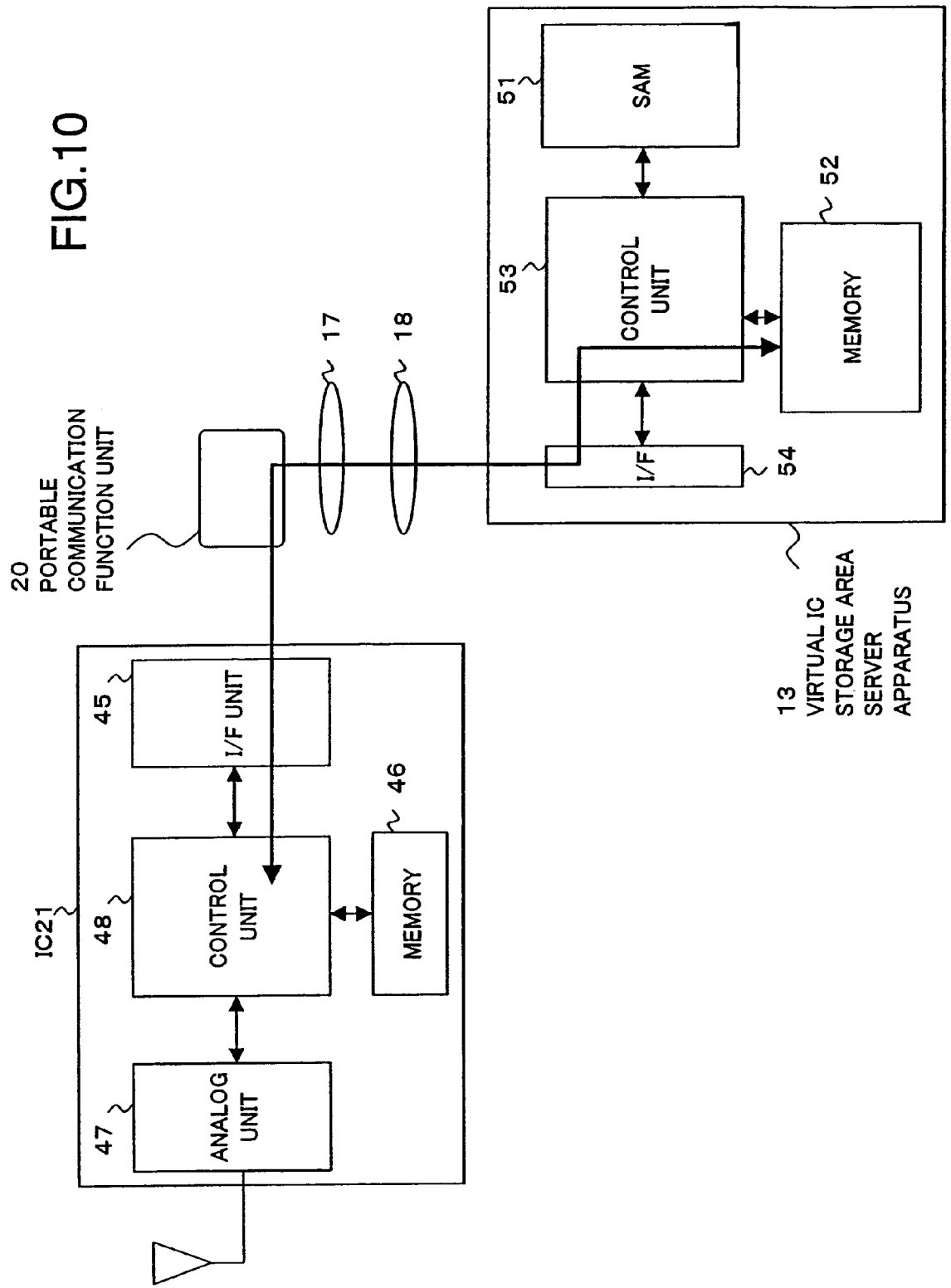
FIG. 10 is a schematic diagram explaining a case wherein the IC shown in FIG. 1 uses a memory of the virtual IC storage area server apparatus.

The IC 21, as shown in FIG. 10, utilizes an application program stored in a memory 52 of the virtual IC storage area server apparatus 13 shown in FIG. 3 through the portable communication function unit 20, the wireless communication line 17, and the network 18. The virtual IC storage area server apparatus 13 may be directly connected to the wireless communication line 17 by an exclusive line or the like.

Figure 11:
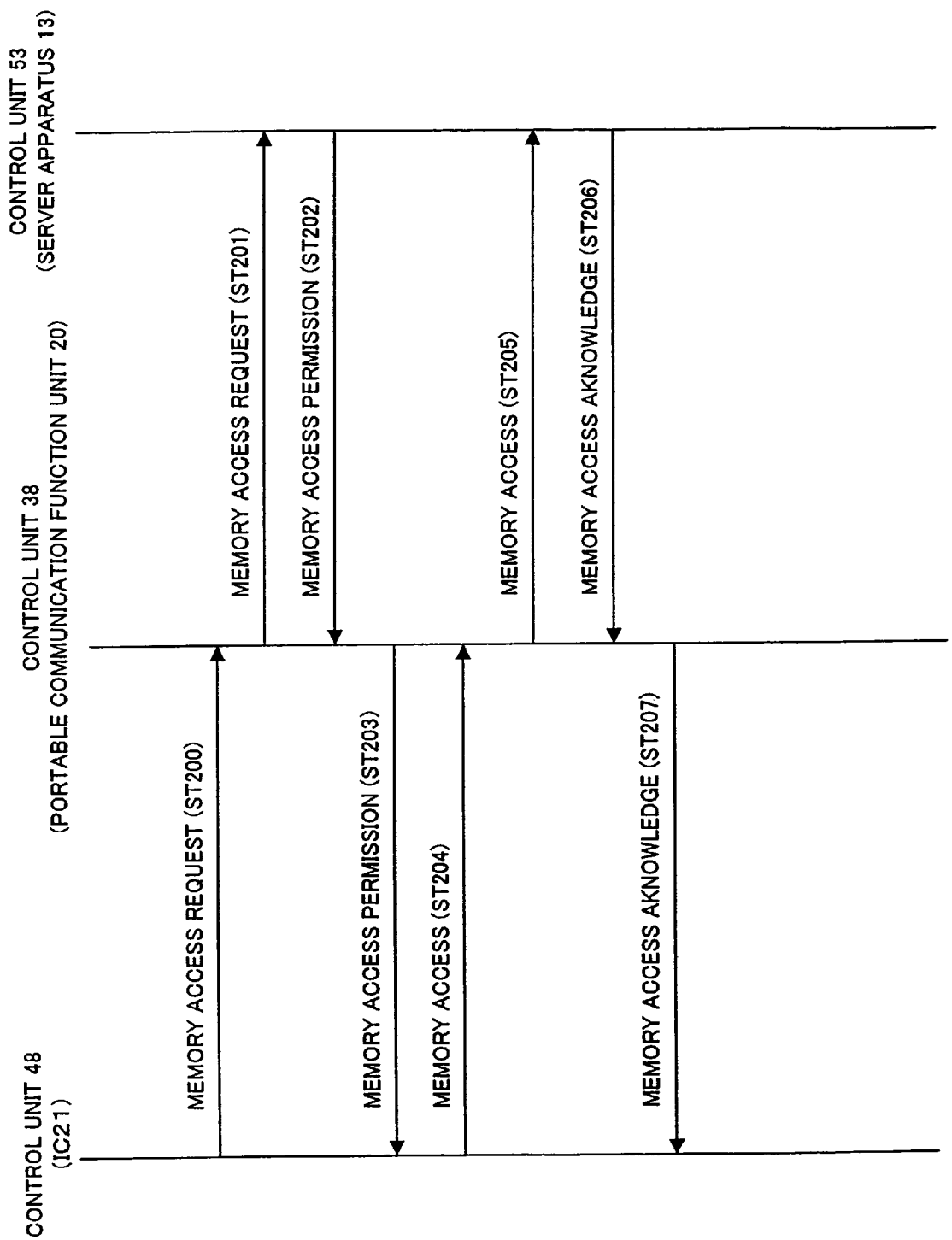
FIG. 11 is a schematic diagram explaining a control flow of the case shown in FIG. 10.

FIG. 11 is a view for explaining a process sequence between the IC 21, the portable communication function unit 20 and the virtual IC storage area server apparatus 13 in the case where the IC 21 utilizes an application program stored in the memory 52 of the virtual IC storage area server apparatus 13.

As shown in FIG. 11, the control unit 48 of the IC 21 transmits a memory access request to the control unit 38 of the portable communication function unit 20 (Step ST200), and in response thereto, the control unit 38 transmits the memory access request to control unit 53 of the virtual IC storage area server apparatus 13 (Step ST201).

Then, in the case access to the memory 52 from the IC 21 is permitted, the control unit 53 transmits a memory access permission notification to the control unit 38 of the portable communication function unit 20 (Step ST202), and the control unit 38 transmits the memory access permission notification to the control unit 48 of the IC 21 in response thereto (Step ST203).

Then, when the control unit 48 of the IC 21 receives the memory access permission notification at step ST203, it performs a memory access operation to the control unit 38 of the portable communication function 20 (Step ST204), and in response thereto, the control unit 38 performs the memory access operation to the control unit 53 of the virtual IC storage area server apparatus 13 (Step ST205).

The control unit 53 accesses the memory 52 in response to the memory access operation received from the control unit 38.

Then, when memory access is completed, the control unit 53 of the virtual IC storage area server apparatus 13 outputs a memory access acknowledge to the control unit 38 of the portable communication function unit 20 (Step ST206), and in response thereto, the control unit 38 outputs the memory access acknowledge to the control unit 48 of the IC 21 (Step ST207).

Figure 12:
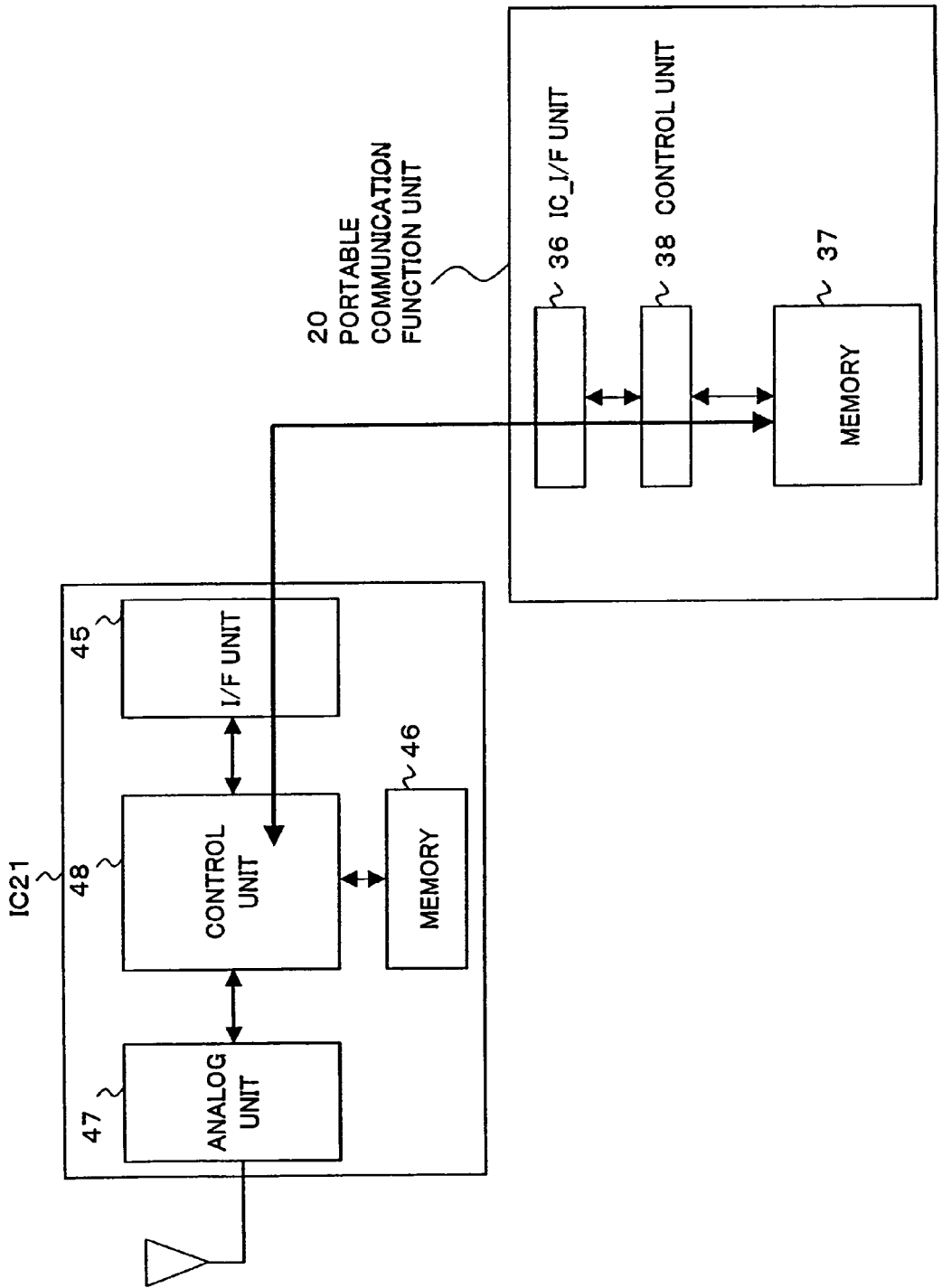
FIG. 12 is a schematic diagram explaining a case wherein the IC shown in FIG. 1 uses a memory of the portable communication function unit.

Further, an application program defining a process of the IC 21 is stored in the memory 37 of the portable communication function unit 20, as shown in FIG. 12, the control unit 48 of the IC 21 accesses the memory 37 through the I/F unit 45, the IC_I/F unit 36, and the control unit 38. In this case, the control unit 48 may execute an application program read from the memory 37, or the control unit 38 may execute the application program.

It should be appreciated that in this case the control unit 48 may hand over the access authority of the application program stored in the memory 37 to the control unit 38, or the control unit 48 and the control unit 38 may access the application program while transmitting commands between each other. Thus, according to the portable communication function unit 20 and the IC 21, providing the I/F unit 45 and the IC_I/F unit 36 enabled communication between the portable communication function unit 20 and the IC 21.

Below, an example of an operation of the communication system shown in FIG. 1 is explained.

Below, an explanation will be given of the example of the operation of the communication system 1 illustrating a case of performing a process relating to a service using the IC 21 by utilizing an application program stored in the virtual IC storage area server apparatus 13 when a service to be used by the user A is specified and selected by the user A.

Figure 13:
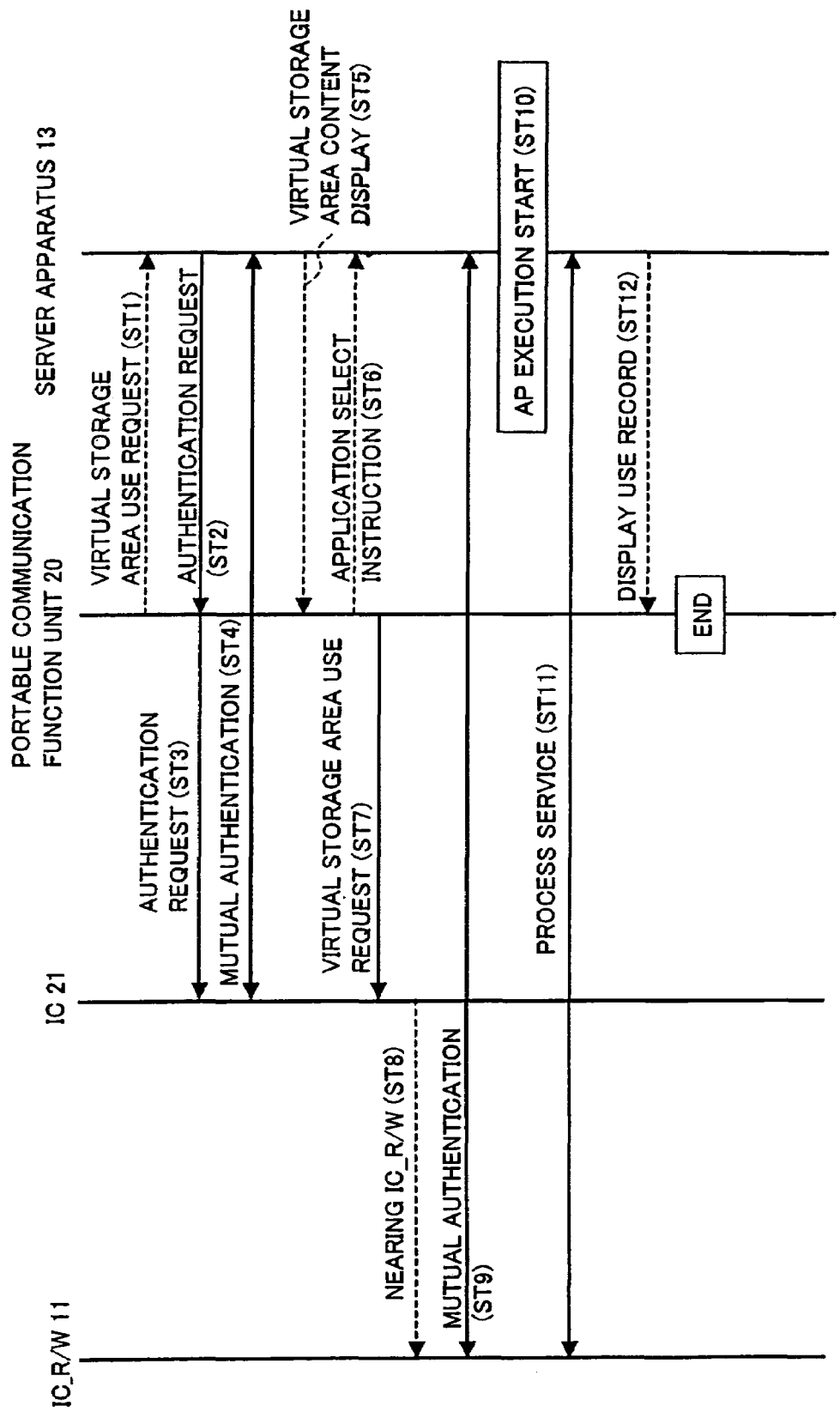
FIG. 13 is a chart explaining an example of the operation of the communication system illustrating a case of performing a process relating to a service using the IC by utilizing an application program stored in the virtual IC storage area server apparatus shown in FIG. 1 when a service specified by a user A to be used by the user A is selected.

FIG. 13 is a flow chart for explaining the above explanation and each of the steps shown in FIG. 13.

Step ST1:

The user A operates the operation unit 35 of the portable communication function unit 20 of the portable telephone apparatus 14 shown in FIG. 8, and in response to this operation, the control unit 38 shown in FIG. 8 generates a virtual storage area use request (use request of the present invention) and transmits the same to the virtual IC storage area server apparatus 13.

Step ST2:

When the virtual IC storage area server apparatus 13 shown in FIG. 3 receives the virtual storage area use request at step ST1, based on a control of the control 53, the SAM 51 generates an authentication request and transmits this to the portable communication function unit 20.

Step ST3:

When the portable communication function unit 20 shown in FIG. 8 receives the authentication request at step ST2, the control unit 38 generates an authentication request and transmits the authentication request to the IC 21 through the IC_I/F unit 36.

The IC 21 shown in FIG. 9 receives the authentication request from the portable communication function unit 20 by the I/F unit 45.

Step ST4:

The control unit 48 of the IC 21 performs mutual authentication with the virtual IC storage area server apparatus 13 through the portable communication function unit 20 in response to the authentication request received at step ST3.

Step ST5:

When one another's legitimacy is authenticated by the mutual authentication of step ST4, the control unit 53 of the virtual IC storage area server apparatus 13 displays a content (content of a service) of a virtual storage area corresponding to the portable telephone apparatus 14 on the display unit 34 of the portable communication function unit 20.

Step ST6:

The user A selects a service for use by operating the operation unit 35 based on the virtual storage area content displayed at step ST5. Due to this, the control unit 38 of the portable communication function unit 20 generates an application select instruction for instructing the selecting of an application program corresponding to the selected service, and transmits the same to the virtual IC storage area server apparatus 13.

Step ST7:

Further, the control unit 38 of the portable communication function unit 20 generates a virtual storage area use instruction and transmits this to the IC 21 through the IC_I/F unit 36.

The IC 21 shown in FIG. 9 receives the virtual storage area use instruction from the portable communication function unit 20 by the I/F unit 45.

Step ST8:

The IC_R/W apparatus 11 and the IC 21 are enabled into a wireless communication state through the antenna 49 of the IC 21. In this case, data is transferred and power is supplied between the IC_R/W apparatus 11 and the IC 21 through the antenna 49, whereby a stabilized direct current voltage is supplied to each of the circuits in the IC 21. Or, the IC_RJW apparatus 11 and the IC 21 may be enabled into a wireless communication state by a power source from a battery inside the portable telephone apparatus 14.

Step ST9:

In response to the application select instruction of step ST6 and the virtual storage area use instruction of step ST7, mutual authentication is conducted between the IC_R/W unit 11 and the virtual IC storage area server apparatus 13 through the IC 21 and the portable communication function unit 20.

Step ST10:

When the legitimacy is authenticated by the mutual authentication of step ST9, the control unit 53 of the virtual IC storage area server apparatus 13 reads the application program determined by the application select instruction received at step ST6 from the memory 52 and starts executing the application program.

Step ST11:

While communicating through the portable communication function unit 20 and the IC 21, the virtual IC storage area server apparatus 13 executing the application program and the IC_R/W unit 11 execute a process relating to a service in collaboration with each other.

Step ST12:

When the processing of step ST11 ends, the virtual IC storage area server apparatus 13 displays a use record thereof and a use record of the service on the display unit 34 of the portable communication function unit 20.

Below, an explanation will be given of the example of the operation of the communication system 1 illustrating the case of performing a process relating to a service using the IC 21 by utilizing an application program stored in the virtual IC storage area server apparatus 13 when a service to be selected by the IC_R/W apparatus 11 is automatically instructed to the virtual IC storage area server apparatus 13.

Figure 14:
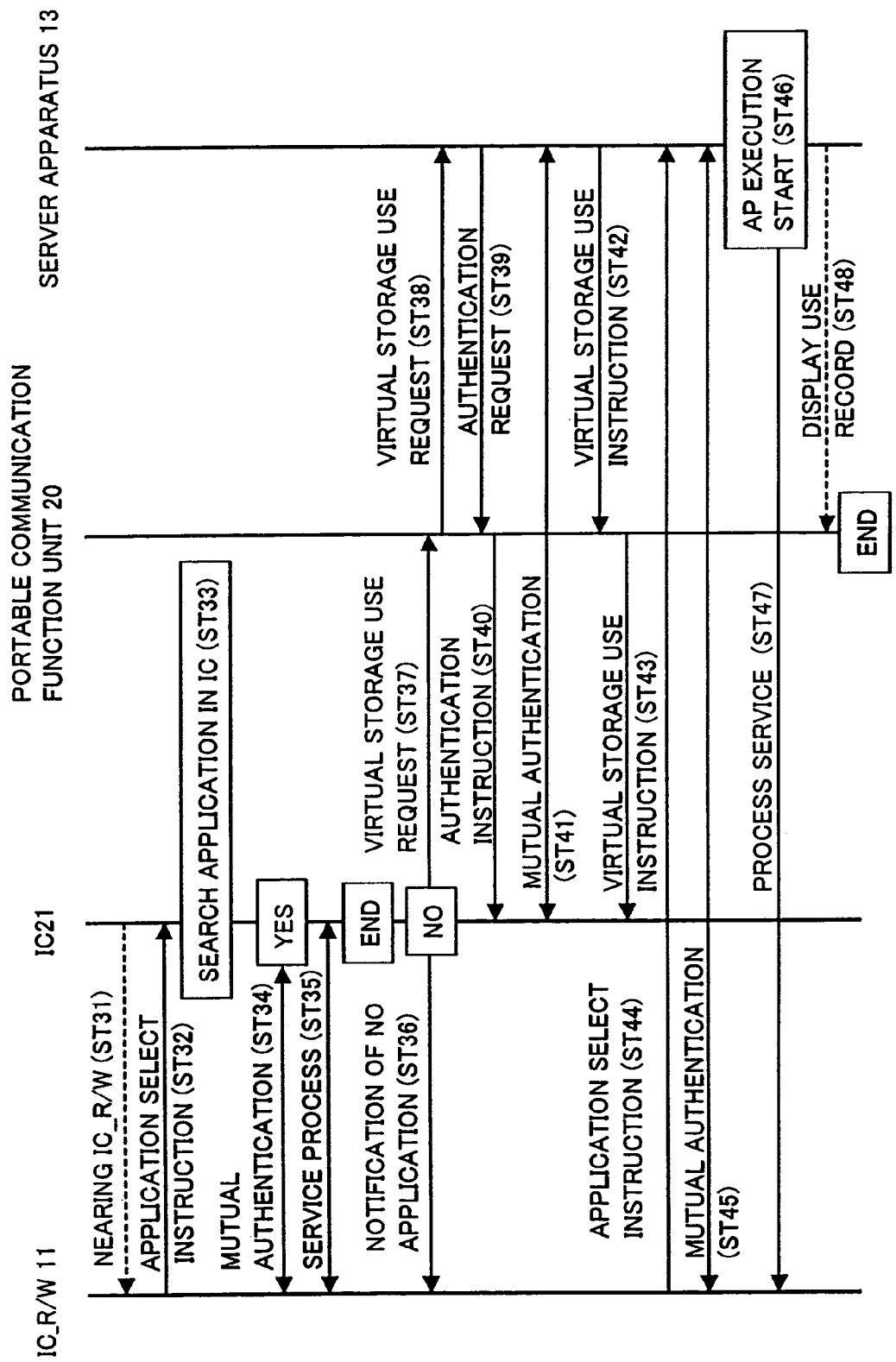
FIG. 14 is a chart explaining an example of the operation of the communication system illustrating a case of performing a process relating to a service using the IC 21 by utilizing an application program stored in the virtual IC storage area server apparatus shown in FIG. 1 when a service to be selected by the IC_R/W apparatus is automatically instructed to the virtual IC storage area server apparatus.

FIG. 14 is a chart for explaining the above exemplified operation.

Step ST31:

The IC_R/W apparatus 11 and the IC 21 are enabled into a wireless communication state through the antenna 49 of the IC 21. In this case, data is transferred and power is supplied between the IC_R/W apparatus 11 and the IC 21 through the antenna 49, whereby a stabilized direct current voltage is supplied to each of the circuits in the IC 21. Or, the IC_R/W apparatus 11 and the IC 21 may be enabled into a wireless communication state by a power source from a battery inside the portable telephone apparatus 14.

Step ST32:

The IC_R/W apparatus 11 transmits an application select instruction for determining an application program corresponding to a service performed using the IC_R/W apparatus 11 to the IC 21. The IC 21 shown in FIG. 9 receives the application select instruction from the IC_R/W apparatus 11 by the antenna 49 shown in FIG. 9.

Step ST33:

The control unit 48 of the IC 21 shown in FIG. 9 conducts a search to check whether the application program determined by the application select instruction received at step ST 32 is stored in the memory 46 or not.

Then, when the control unit 48 judges or determines that the application program is stored in the memory 46, proceeds to the processing of step ST34, while when it judges that the application program is not stored in the memory 46, proceeds to the processing of step ST36.

Step ST34:

When it has been judged at step ST33 that the application program is stored in the memory 46, the IC 21 and the IC_R/W apparatus 11 conduct mutual authentication.

Step ST35:

When one another's legitimacy is authenticated by the mutual authentication of step ST34, the control unit 48 of the IC 21 shown in FIG. 9 reads the application program from the memory 46 to execute the same. Due to this, the IC 21 and the IC_R/W apparatus 11, while in communication, execute the process relating to the service in collaboration with each other.

Step ST36:

When it has been judged at step ST33 that the application program is not stored in the memory 46, the IC 21 notifies the IC_R/W apparatus 11 through the antenna 49 that the there is no application program.

Step ST37:

Further, the control unit 48 of the IC 21 generates a virtual storage area use request and transmits this to the portable communication function 20 through the I/F unit 45.

Step ST38:

The portable communication function 20 shown in FIG. 8 receives the virtual storage area use request from the IC 21 by the IC_I/F unit 36, and transmits the same to the virtual IC storage area server apparatus 13 from the antenna 41.

Step ST39:

When the virtual IC storage area server apparatus 13 shown in FIG. 3 receives the virtual storage area use request at step ST38, based on the control of the control unit 53, the SAM 51 generates an authentication request and transmits this to the portable communication function unit 20.

Step ST 40:

When the portable communication function unit 20 shown in FIG. 8 receives the authentication request at step ST39, the control unit 38 generates an authentication request and transmits the authentication request to the IC 21 through the IC_I/F unit 36. The IC 21 shown in FIG. 9 receives the authentication request from the portable communication function unit 20 through the I/F unit 45.

Step ST41:

The control unit 48 of the IC 21 performs mutual authentication with the virtual IC storage area server apparatus 13 through the portable communication function unit 20 in response to the authentication request received at step ST40.

Step ST42:

When one another's legitimacy is authenticated by the mutual authentication of step ST41, the control unit 53 of the virtual IC storage area server apparatus 13 generates a virtual storage area use instruction and transmits the same to the portable communication function unit 20.

Step ST43:

When the virtual storage area use instruction is received, the control unit 38 of the portable communication function unit 20 transmits this to the IC 21 through the IC_I/F unit 36. The IC 21 shown in FIG. 9 receives the virtual storage area use instruction from the portable communication function unit 20 by the I/F unit 45.

Step ST44:

The IC_R/W apparatus 11 transmits an application select instruction for determining an application program corresponding to a service performed using the IC_R/W apparatus 11 to the virtual IC storage area server apparatus 13 through the IC 21 and the portable communication function unit 20.

Step ST45:

The IC_R/W apparatus 11 and the virtual IC storage area server apparatus 13 perform mutual authentication through the IC 21 and the portable communication function 20.

Step ST46:

When one another's legitimacy is authenticated by the mutual authentication of step ST9, the control unit 53 of the virtual IC storage area server apparatus 13 reads the application program determined by the application select instruction received at step ST6 from the memory 52 and starts executing the application program.

Step ST47:

The virtual IC storage area server apparatus 13 executing the application program, and the IC_R/W unit 11 execute a process relating to a service in collaboration with each other while communicating through the portable communication function unit 20 and the IC 21.

Step ST48:

When the processing of step ST47 ends, the virtual IC storage area server apparatus 13 displays a use record thereof and a use record of the service on the display unit 34 of the portable communication function unit 20.

Below, an explanation is given of an example of the operation of the communication system 1 illustrating the case of registering (secure) the IC virtual storage area 60a used by the IC 21 of the portable telephone apparatus 14 in a storage area of the memory 52 of the virtual IC storage area server apparatus 13 shown in FIG. 3.

Figure 15:
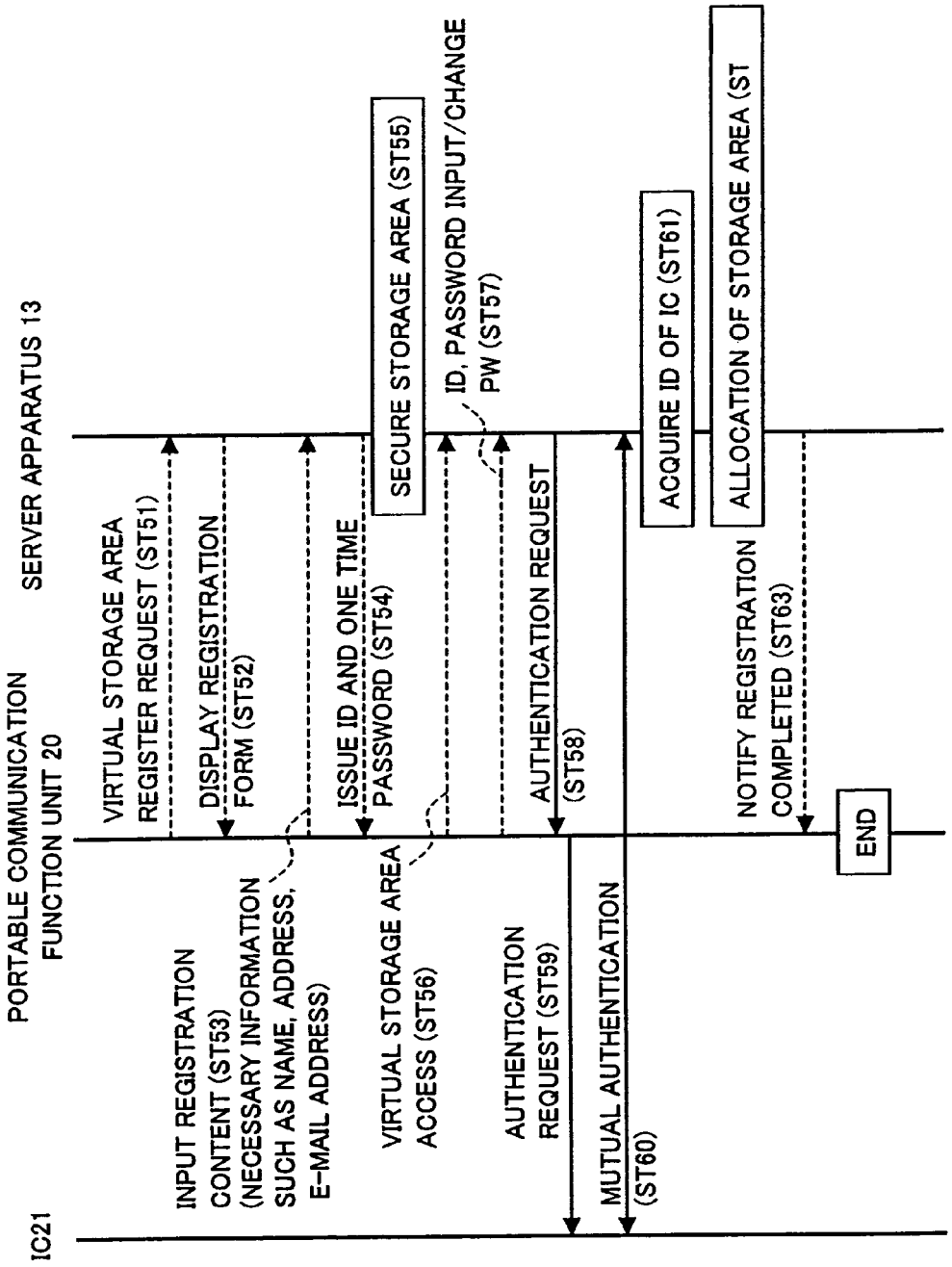
FIG. 15 is a chart for explaining an example of the operation of the communication system illustrating a case of registering (allocating) an IC virtual storage area used by the IC of the portable telephone apparatus in a storage area of the memory of the virtual IC storage area server apparatus shown in FIG. 3.

FIG. 15 is a chart for explaining the above operation.

Step ST51:

The user A operates the operating unit 35 of the portable communication function unit 20 of the portable telephone apparatus 14 shown in FIG. 8, and in response to the operation, the control unit 38 shown in FIG. 8 generates a virtual storage area register request and transmits the same to the virtual IC storage server apparatus 13.

Step ST52:

The control unit 53 of the virtual IC storage area server apparatus 13 shown in FIG. 3, in response to the virtual storage area register request received at step ST 51, displays a registration form (registration screen) on the display unit 34 of the portable communication function unit 20 shown in FIG. 8.

Step ST53:

The user A inputs information such as the user's own name, address, and e-mail address required for registration according to the registration form of the display unit 34. The inputted information is transmitted to the virtual IC storage area server apparatus 13 through the antenna 41.

Step ST54:

The control unit 53 of the virtual IC storage area server apparatus 13 issues an ID and a one time password for the portable telephone apparatus 14 and transmits the same to the portable communication function unit 20.

Step ST55:

The control unit 53 of the virtual IC storage area server apparatus 13 temporarily secures from among the storage areas in the memory 52, for example, the IC virtual storage area 60a shown in FIG. 5 for the portable telephone apparatus 14 (user A).

Step ST56:

The portable communication function unit 20 accesses the IC virtual storage area 60a by using the ID and the one time password received at step ST54.

Step ST57:

The portable communication function unit 20 changes the password. The changed password is managed by the control unit 53.

Step ST58:

In the virtual IC storage area server apparatus 13 shown in FIG. 3, based on a control of the control 53, the SAM 51 generates an authentication request and transmits this to the portable communication function unit 20.

Step ST59:

When the portable communication function unit 20 shown in FIG. 8 receives the authentication request at step ST58, the control unit 38 generates an authentication request and transmits the authentication request to the IC 21 through the IC_I/F unit 36. The IC 21 shown in FIG. 9 receives the authentication request from the portable communication function unit 20 through the I/F unit 45.

Step ST60:

The control unit 48 of the IC 21 performs mutual authentication with the virtual IC storage area server apparatus 13 through the portable communication function unit 20 in response to the authentication request received at step ST59.

Step ST61:

When one another's legitimacy is authenticated by the mutual authentication of step ST60, an ID of the IC 21 (individual data) is received from the SAM 51 of the virtual IC storage area server apparatus 13.

Step ST62:

The SAM 51 of the virtual IC storage area server apparatus registers the ID of the IC 21 received at step ST 61, the ID issued at step ST54, and the password received at step ST57 in correspondence with the IC virtual storage area 60a shown in FIG. 5.

Step ST63:

The virtual IC storage area server apparatus 13 notifies the portable communication function unit 20 the fact that the IC virtual storage area 60a has been allocated to the portable telephone apparatus 14.

Below, an explanation is given of an example of the operation illustrating a case of registering the application program 65a in the IC virtual storage area 60a allocated to the portable telephone apparatus 14 in the above operation in response to an operation of the user A.

Figure 16:
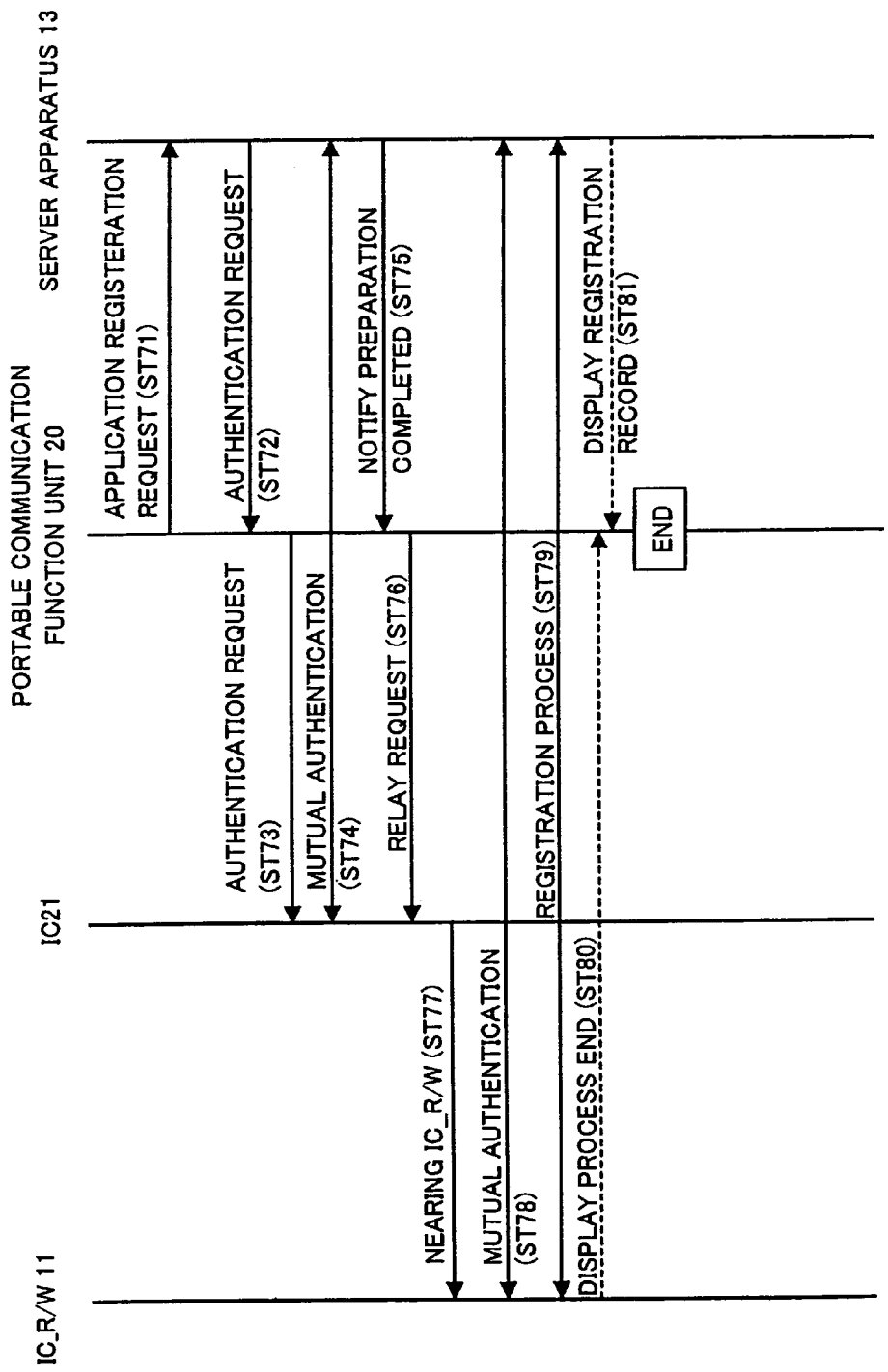
FIG. 16 is a chart for explaining an example of the operation illustrating a case of registering an application program in the IC virtual storage area allocated to the portable telephone apparatus in the third exemplified operation in response to an operation of the user A.

FIG. 16 is a chart for explaining the above exemplified operation.

Step ST71:

The user A operates the operation unit 35 of the portable communication function unit 20 of the portable telephone apparatus 14 shown in FIG. 8, and in response to the operation, the control unit 38 shown in FIG. 8 generates an application register request and transmits the same to the virtual IC storage area server apparatus 13.

Step ST72:

When the virtual IC storage area server apparatus 13 shown in FIG. 3 receives the application register request at step ST71, the SAM 51 generates an authentication request and transmits the same to the portable communication function unit 20 based on the control of the control unit 53.

Step ST73:

When the portable communication function 20 shown in FIG. 8 receives the authentication request at step ST72, the control unit 38 generates an authentication request and transmits the authentication request to the IC 21 through the IC_I/F unit 36. The IC 21 shown in FIG. 9 receives the authentication request from the portable communication function unit 20 by the I/F unit 45.

Step ST74:

The control unit 48 of the IC 21 performs mutual authentication with the virtual IC storage area server apparatus 13 through the portable communication function unit 20 in response to the authentication request received at step ST73.

Step ST75:

When one another's legitimacy is authenticated by the mutual authentication of step ST74, the control unit 53 of the virtual IC storage area server apparatus 13 notifies the portable communication function unit 20 that preparation of registering the application is completed.

Step ST76:

The portable communication function unit 20 generates a relay instruction based on the notification of step ST75 and transmits the same to the IC 21 through the IC_I/F unit 36. The IC 21 shown in FIG. 9 receives the relay instruction from the portable communication function unit 20 by the I/F unit 45.

Step ST77:

The IC_R/W apparatus 11 and the IC 21 are enabled to be in a wireless communication state via the antenna 49.

Step ST78:

The IC_R/W apparatus 11 and the virtual IC storage area server apparatus 13 perform mutual authentication through the IC 21 and the portable communication function 20.

Step ST79:

When one another's legitimacy is authenticated by the mutual authentication of step ST78, the virtual IC storage area server apparatus 13 and the IC_R/W apparatus 11, while communicating through the portable communication function unit 20 and the IC 21, performs the registering process of the application program 65a in collaboration with each other.

Specifically, the application program 65a is transmitted to the virtual IC storage area server apparatus 13 from the IC_R/W apparatus 11, whereby the application program 65a is written in the memory 52 of the virtual IC storage area server apparatus 13.

Step ST80:

When the processing of step ST79 ends, the IC_R/W apparatus 11 notifies the portable communication function unit 20 through the IC 21 that the application program registration process has ended.

Step ST81:

When the processing of step ST79 ends, the virtual IC storage area server apparatus 13 notifies the portable communication function unit 20 that the application program registration process has ended.

Due to this, the portable communication function unit 20 ends the application program registration process.

Below, an explanation is given of an example of the operation illustrating a case wherein an application program is automatically registered in the IC virtual storage area 60a allocated to the portable telephone apparatus 14 in the above third exemplified operation by the IC_R/W apparatus 11.

Figure 17:
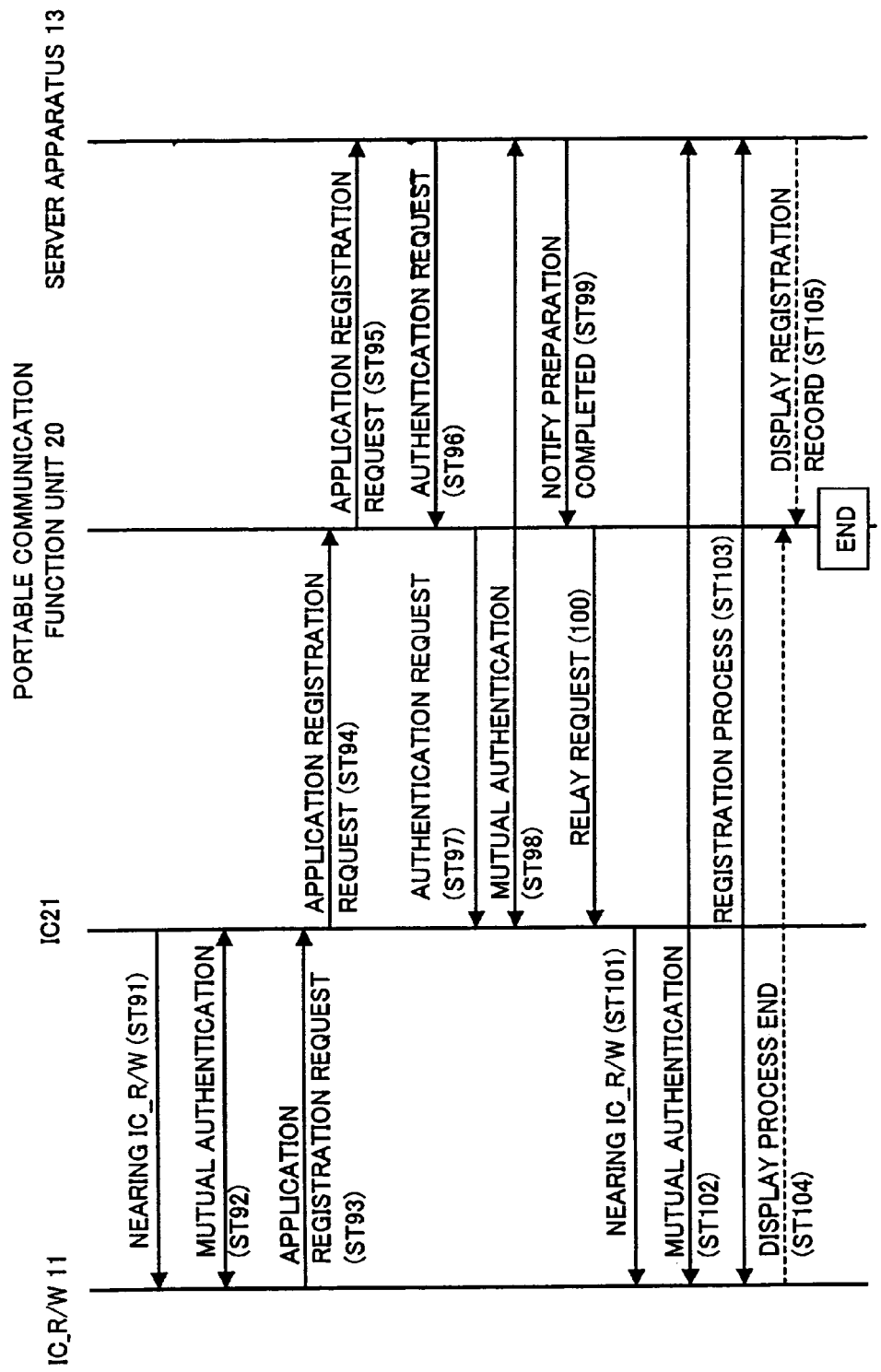
FIG. 17 is a chart for explaining an example of the operation illustrating a case wherein an application program is automatically registered in the IC virtual storage area allocated to the portable telephone apparatus in the third exemplified operation by the IC_R/W apparatus.

FIG. 17 is a chart for explaining the above operation.

Step ST91:

The IC_R/W apparatus 11 and the IC 21 are enabled to be in a wireless communication state via the antenna 49.

Step ST92:

The IC_R/W apparatus 11 and the IC 21 perform mutual authentication.

Step ST93:

When one another's legitimacy is authenticated by the mutual authentication of step ST92, an application registration request is transmitted to the IC 21 from the IC_R/W apparatus 11.

The application registration request is received through the antenna 49 of the IC 21 shown in FIG. 9.

Step ST94:

The IC 21 transmits the application registration request received at step ST93 to the portable communication function unit 20 through the I/F unit 45 shown in FIG. 9.

Steps ST95 to ST105:

Each of the processes of steps St95 to ST 105 shown in FIG. 17 are the same as the processes of steps ST71 to ST81 shown in FIG. 16.

As explained above, in the communication system 1, even though the storage capacity of the memory 46 of the IC 21 shown in FIG. 1 and FIG. 9 is limited, by storing in the virtual IC storage area server apparatus 13 the application program relating to a service performed using the data carrier function and/or the individual authentication function built into a chip of the IC 21 and executing the same, a variety of services can be provided even if using the IC 21 provided with a comparatively small size memory. It is not necessary to download the application program from the virtual IC storage area server apparatus 13 to the IC 21.

In other words, the IC 21 can utilize the virtual IC storage area server apparatus 13 of the network 18 as a virtual memory, whereby a plurality of services performed using a plurality of applications can be provided using one IC 21.

Further, according to communication system 1, after the IC 21 and the virtual IC storage area server apparatus 13 have performed mutual authentication, and the IC_R/W apparatus 11 and the virtual IC storage area server apparatus 13 have performed mutual authentication, in order for the virtual IC storage area server apparatus 13 executing an application program and the IC_R/W apparatus 11 to execute the process relating to a service in collaboration with each other, illicit access can be prevented.

An effect of the above-mentioned communication system 1 is realized by the configuration and operation of the IC 21 built into the aforementioned portable telephone apparatus 14.

Further, according to the IC 21 built into the portable telephone apparatus 14, as shown in FIG. 9, providing the I/F unit 45 for communicating with the portable communication function unit 20 in addition to the antenna 45 which communicates with the IC_R/W apparatus 11 enabled the portable communication function unit 20 and the IC 21 to mutually control each other. Therefore, for example, the portable communication function unit 20 is capable of disabling the IC 21 and the IC 21 is capable of disabling the portable communication function unit 20 under a constant condition, whereby various controls can be realized from the viewpoint of a content and security of a service.

Figure 18:
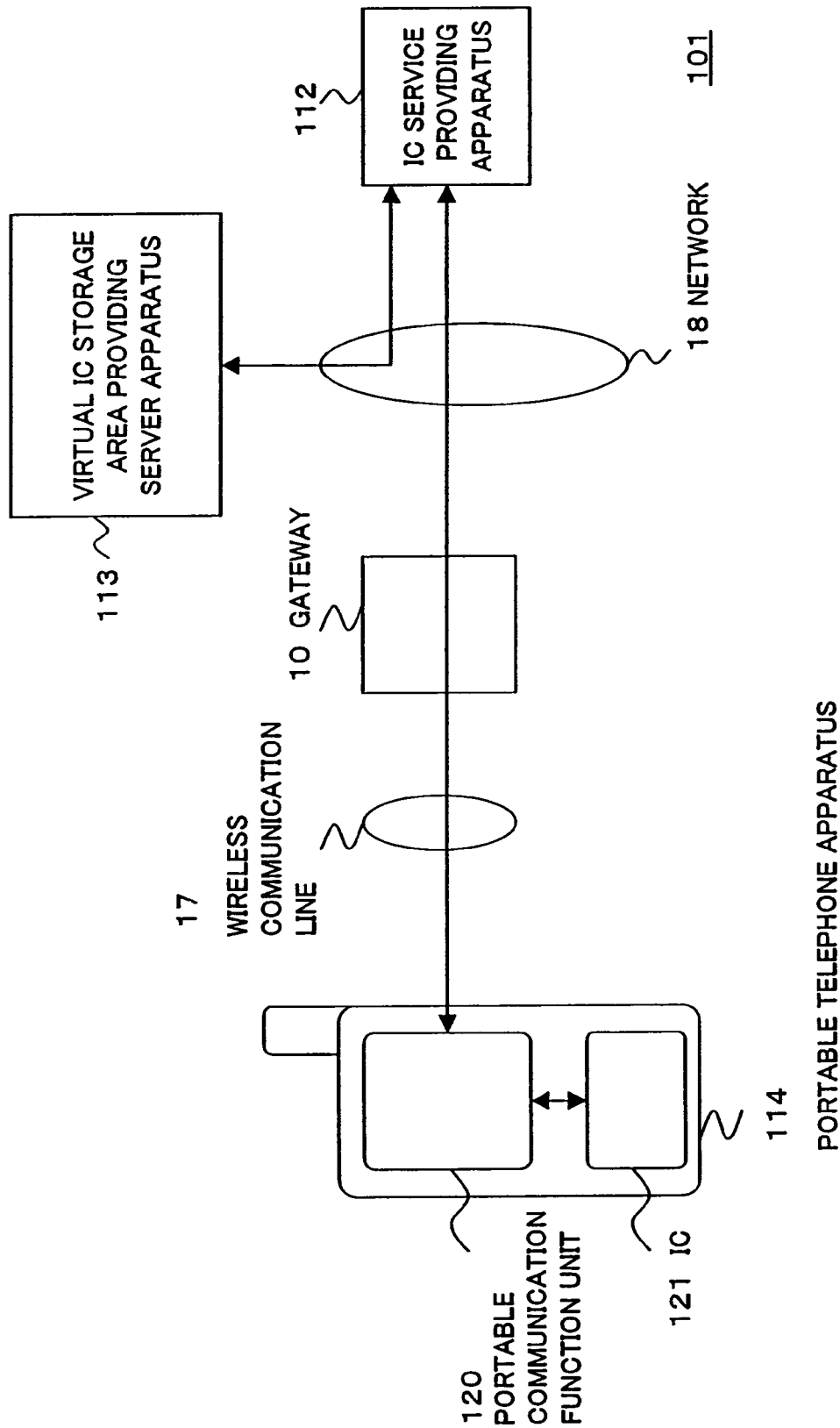
FIG. 18 is a schematic diagram of the overall configuration of a communication system of another embodiment of the present invention.

FIG. 18 is a schematic diagram of the overall configuration of a communication system 101 of the present invention.

As shown in FIG. 18, the communication system 101 comprises, for example, a gateway 10, an IC service providing apparatus 112, a virtual IC storage area server apparatus 113, and a portable telephone apparatus 114.

The portable telephone apparatus 114 and the virtual IC storage area server apparatus 113 communicate through the wireless communication line 17 or other portable telephone communication network, the gateway 10, and the network 18 such as the Internet.

Further, the gateway 10, the IC service providing apparatus 112, and the virtual IC storage area server apparatus 113 are connected to the network 18.

As shown in FIG. 18, the communication system 101 is different from the communication system 1 shown in FIG. 1 in that the IC service providing apparatus 112 is connected to the network 18.

In the communication system 101, after the portable telephone apparatus 114 and the IC service providing apparatus 112 have communicated, the virtual IC storage area server apparatus 13 for executing an application program and the IC service providing apparatus 12 communicate through the network 18 to be in collaboration with each other to thereby execute a process relating to an IC 121. The virtual IC storage area server apparatus 113 is directly connected to the gateway 10, and the IC service providing apparatus 112 may be connected through the gateway 10 and the network 18.

Below, each of the components shown in FIG. 18 are explained.

Figure 19:
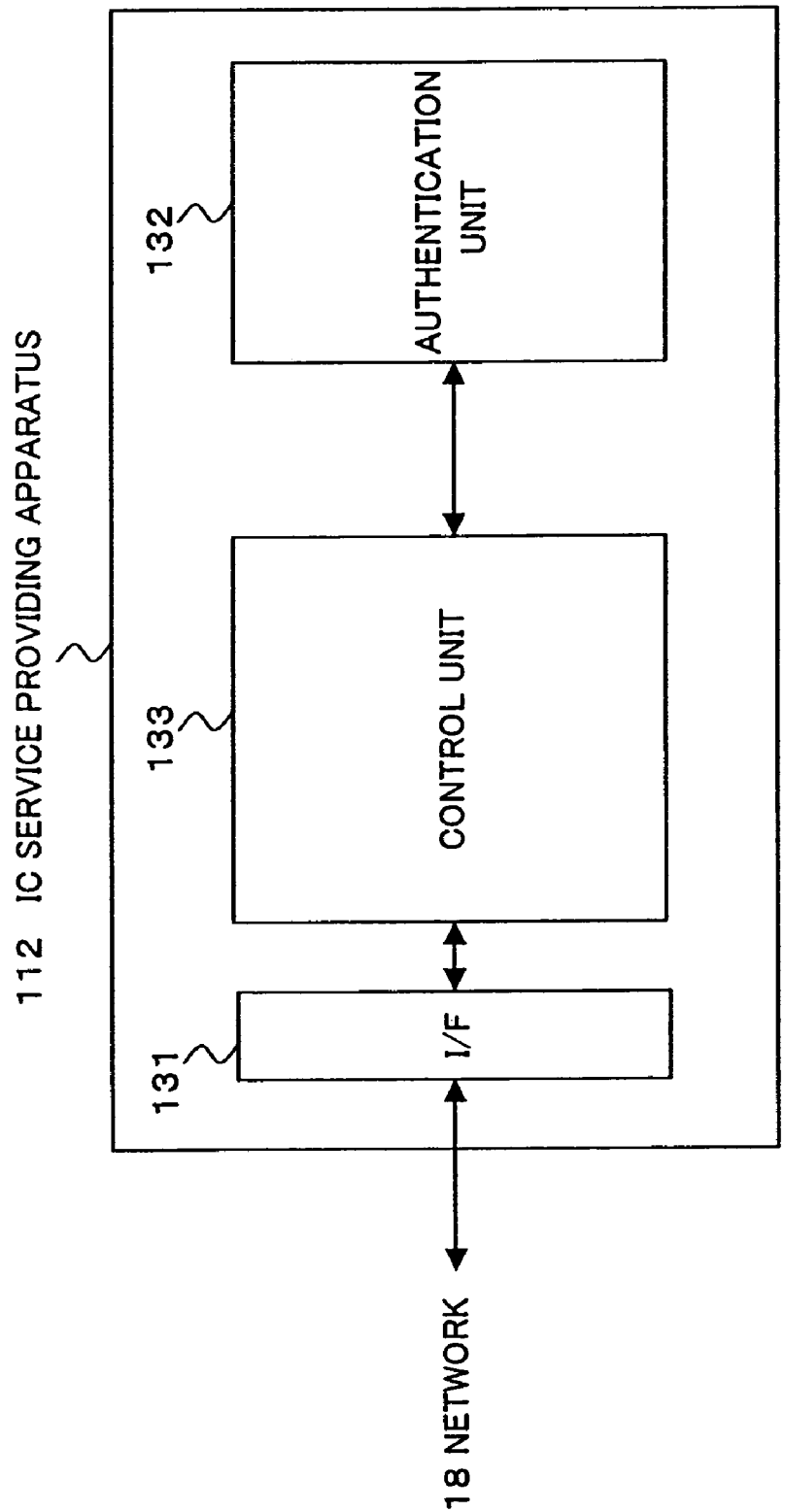
FIG. 19 is a block diagram of an IC service providing apparatus shown in FIG. 18.

FIG. 19 is block diagram of the IC service providing apparatus 112 shown in FIG. 18.

As shown in FIG. 19, the IC service providing apparatus 112 is comprised of, for example, an I/F unit 131, an authentication unit 132, and a control unit 133.

The I/F unit 131 is connected to the network 18 shown in FIG. 18 and transfers a request and data through the network 18.

The authentication unit 132 performs mutual authentication with the virtual IC storage area server apparatus 113.

The control unit 133 comprehensively controls the processes of the service providing apparatus 112.

The virtual IC storage area server apparatus 113 functions as a virtual memory of the IC 121 of the portable telephone apparatus 114, stores an application program relating to a service performed using a data carrier function and/or individual authentication function built into a chip of the IC 121, and executes the application program in response to an instruction from the IC 121. In response to the execution of the application program, the virtual IC storage area server apparatus 113, while communicating with the IC service providing apparatus 112 through the network 18 without going through the portable telephone apparatus 114, executes a service in collaboration with the IC service providing apparatus 112.

FIG. 20 is a block diagram of the virtual IC storage area server apparatus 113 shown in FIG. 18. As shown in FIG. 20, the virtual IC storage area server apparatus 113 comprises, for example, a SAM 151, a memory 152, a control unit 153, and an I/F unit 154. The SAM 151 is a tamper-resistant module of a hardware or software. The SAM 151 conducts mutual authentication with the IC 121, mutual authentication with the IC service providing apparatus 112, encryption of an application program to be registered (write) in the memory 152, and decryption of an application program read from the memory 152.

The memory 152 is used as a virtual memory of the IC 121 and stores an application program relating to a service using the IC 121. The memory 152, as shown in FIG. 20, comprises the IC virtual storage areas 60a, 60b, 60c . . . allocated to every user (portable telephone apparatus) in advance by a registration process which will be explained later. For example, the IC virtual storage area 60a is allocated to the user A of the portable telephone apparatus 14, the IC virtual storage area 60b is allocated to a user B, and the IC virtual storage area 60c is allocated to a user C.

Further, for example as shown in FIG. 6, the application programs 65a, 65b, and 65c registered by an application program registering process which will be explained below are stored in the IC virtual storage area 60a. The application programs 65a, 65b, and 65c respectively are programs defining processes relating to services provided using the IC 21.

The control unit 153 comprehensively controls the processes of the virtual IC storage area server apparatus 113. The control unit 153 executes for example an application program read from the memory 152. Further, the control unit 153 manages an application program stored in the memory 152. Specifically, the memory control unit 75 for example allocates the IC virtual storage area 60a to the portable telephone apparatus 114 and registers the application programs 65a, 65b, and 65c to the IC virtual storage area 60a.

As shown in FIG. 18, the portable telephone apparatus 114 comprises a portable communication function unit 120 and the IC 121.

The portable communication function unit 120 has a configuration similar to that of the portable communication function unit 20 of the first embodiment explained using FIG. 8.

The IC 121 is a tamper-resistant integrated circuit capable of preventing illicit monitoring and tampering of data and processes in the IC 121 and data to be transferred with the outside, and performs processes relating to various kinds of services determined in advance to be provided by using the IC service providing apparatus 112.

Figure 21:
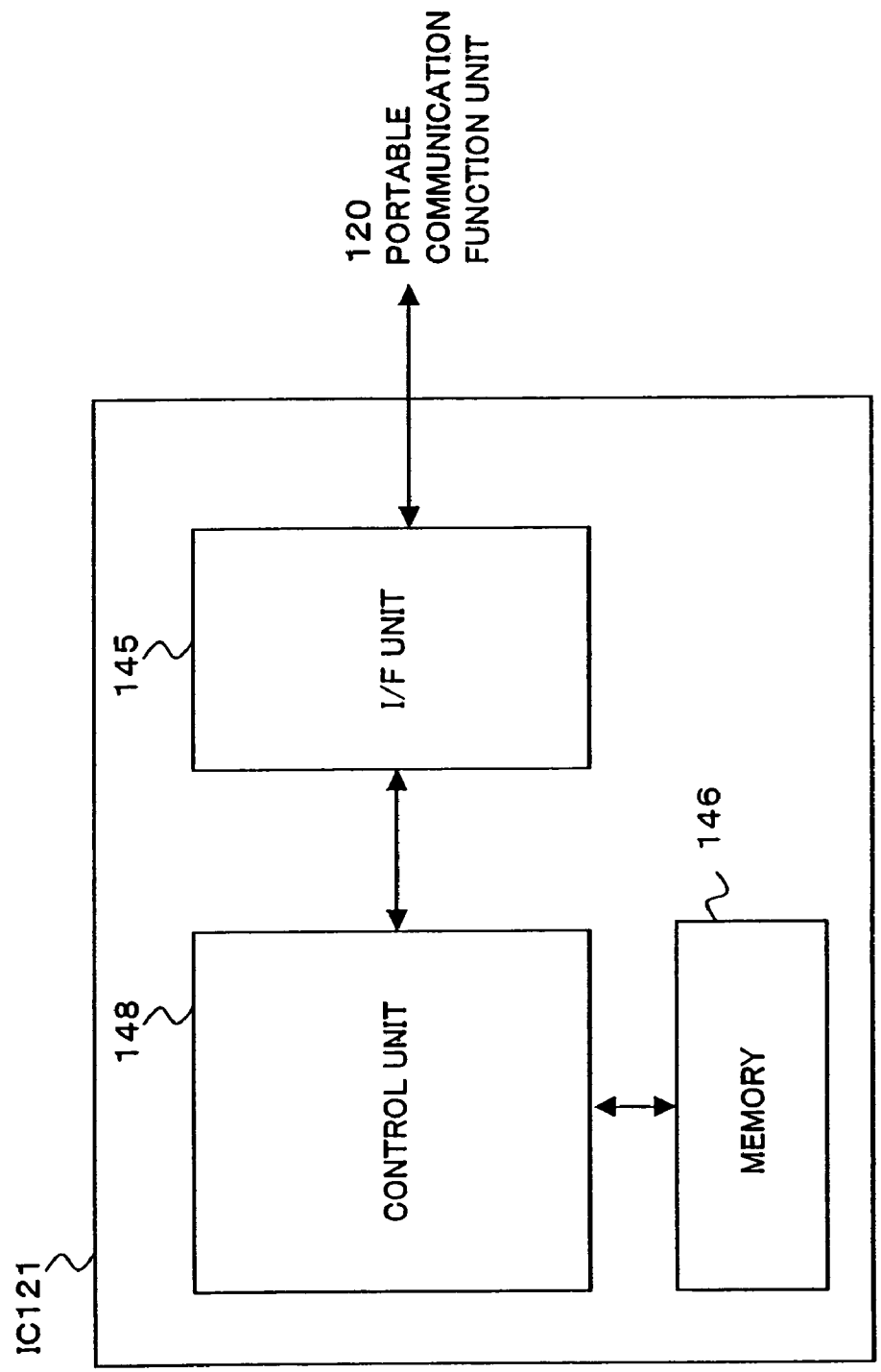
FIG. 21 is a block diagram of an IC shown in FIG. 18.

FIG. 21 is a block diagram of the IC 121 shown in FIG. 18. As shown in FIG. 21, the IC 121 comprises, for example, an I/F unit 145, a memory 146, and a control unit 148.

The I/F unit 45 is an interface for transferring data with the portable communication function unit 120 shown FIG. 18 by a wired system or wireless system.

The memory 146 stores data and a program required in a process of the control unit 48. Note that an application program used in a portion of a service of the various services provided by using the IC 21 may be stored in the memory 146.

The control unit 148 comprehensively controls the process of the IC 121, transfers a command with the control unit 38 shown in FIG. 8, and conducts a predetermined control in collaboration therewith.

Below, an example of an operation of the communication system 101 shown in FIG. 18 is explained. Below, an explanation will be given of the example of the operation of the communication system 101 illustrating a case of performing a process relating to a service using the IC 121 by utilizing an application program stored in the virtual IC storage area server apparatus 113 when a service to be used by the user A is specified and selected by the user A.

Figure 22:
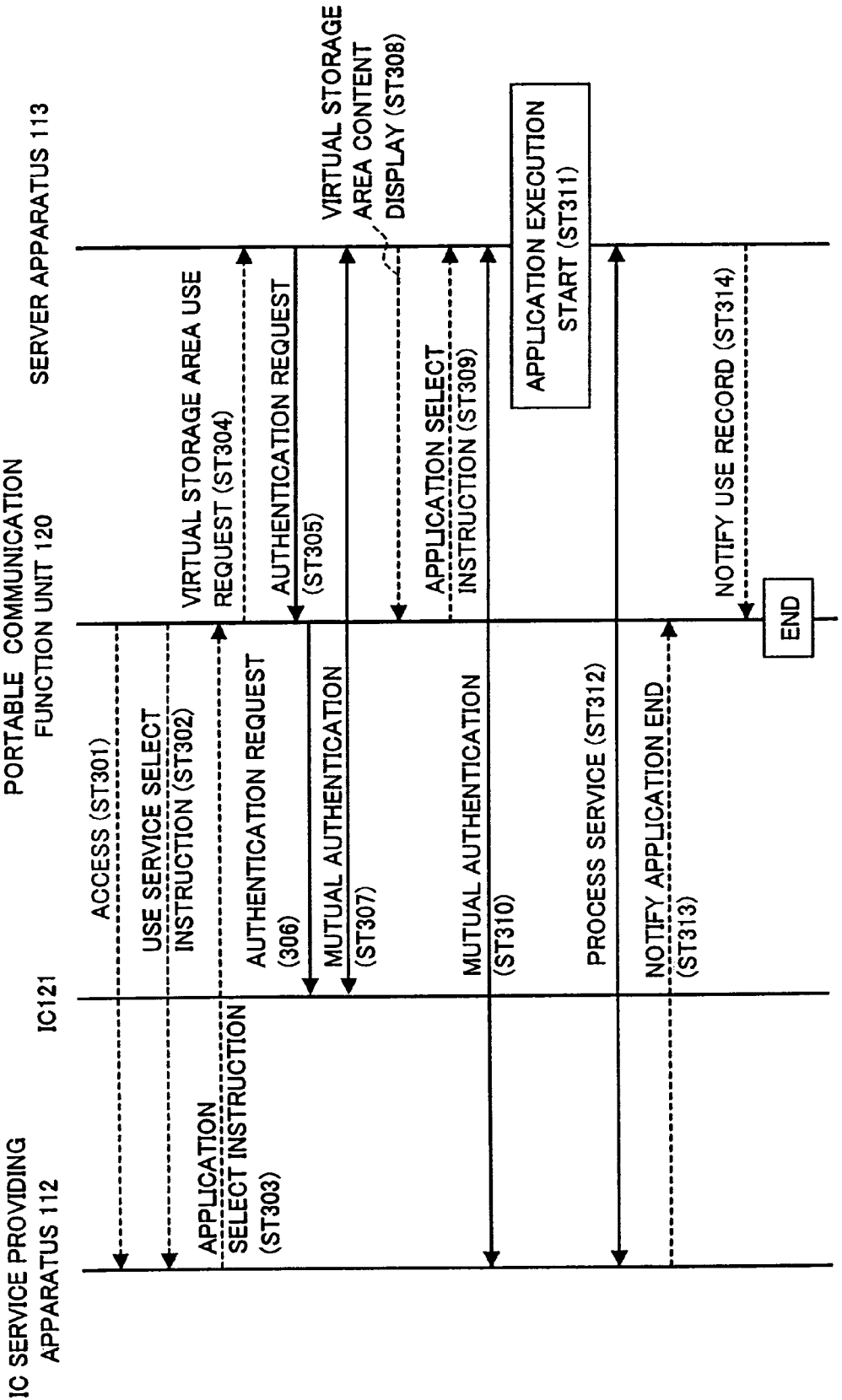
FIG. 22 is a chart explaining an example of an operation of the communication system illustrating a case of performing a process relating to a service using the IC by utilizing an application program stored in the virtual IC storage area server apparatus shown in FIG. 18 when a service to be used by a user A is specified and selected by the user A.

FIG. 22 is a chart for illustrating the above explanation. Below, each of the steps shown in FIG. 22 are explained.

Step ST301:

The user A operates the operation unit 35 shown in FIG. 8 of the portable communication function unit 120 of the portable telephone apparatus 114, and in response to this operation, the control unit 38 shown in FIG. 8 access the IC service providing apparatus 112 through the wireless communication line 17, the gateway 10, and the network 18.

Step ST302:

The user A operates the operation unit 35, whereby in response to this operation, the control unit 38 transmits a use service select instruction for selecting and instructing a service to be used to the IC service providing apparatus 112.

Step ST303:

The control unit 133 of the IC service providing apparatus 112 shown in FIG. 19 generates an application select instruction that has specified an application program corresponding to the use service select instruction received at step ST302 and transmits the same to the portable communication function unit 120 of the portable telephone apparatus 114.

Step ST304:

The control unit 153 of the virtual IC storage area server apparatus 113 shown in FIG. 20 generates a virtual storage area use request in response to the application select instruction received at step ST303 and transmits the same to the virtual IC storage area server apparatus 113.

Step ST305:

When the virtual IC storage area server apparatus 113 shown in FIG. 20 receives the virtual storage area use request at step ST304, based on a control of the control unit 153, the SAM 151 generates an authentication request and transmits the same to the portable communication function unit 120.

Step ST306:

When the portable communication function unit 120 receives the authentication request at step ST305, the control unit 38 generates an authentication request and transmits the authentication request to the IC 121 through the IC_I/F unit 36.

The IC 121 shown in FIG. 21 receives the authentication request from the portable communication function unit 120 by the I/F unit 145.

Step ST307:

The control unit 148 of the IC 121 conducts mutual authentication with the virtual IC storage area server apparatus 113 through the portable communication function unit 120 in response to the authentication request received at step ST306.

Step ST308:

When one another's legitimacy is authenticated by the mutual authentication of step ST307, the control unit 153 of the virtual IC storage area server apparatus 113 displays a content (content of a service) of a virtual storage area corresponding to the portable telephone apparatus 114 on the display unit 34 of the portable communication function unit 120.

Step ST309:

The user A selects a service for use by operating the operation unit 35 based on the virtual storage area content displayed at step ST308. Due to this, the control unit 38 of the portable communication function unit 120 generates an application select instruction for instructing the selecting of an application program corresponding to the selected service, and transmits the same to the virtual IC storage area server apparatus 113.

Step ST310:

In response to the application select instruction of step ST309, the IC service providing apparatus 112 and the virtual IV storage area server apparatus 113 conduct mutual authentication through the network 18.

Step ST311:

When one another's legitimacy is authenticated by the mutual authentication of step ST310, the control unit 153 of the virtual IC storage area server apparatus 113 shown in FIG. 20 reads the application program determined by the application select instruction received at step ST309 from the memory 152 to start executing the same.

Step ST312:

While communicating through the network 18, the virtual IC storage area server apparatus 113 executing the application program and the IC service providing apparatus 112 perform a process relating to a service in collaboration with each other.

Step ST313:

When the processing of step ST312 ends, the IC service providing apparatus 112 notifies the portable communication function unit 120 the end of the application process.

Step ST314:

When the processing of step ST312 ends, the virtual IC storage area server apparatus 113 displays a use record thereof and a use record of the service on the display unit 34 of the portable communication function unit 120. Below, an explanation will be given of an example of the operation of the communication system 101 illustrating a case of performing a process relating to a service using the IC 121 by utilizing an application program stored in the virtual IC storage area server apparatus 113 when a service provided by the IC service providing apparatus 112 itself is automatically instructed to the virtual IC storage area server apparatus 113.

Figure 23:
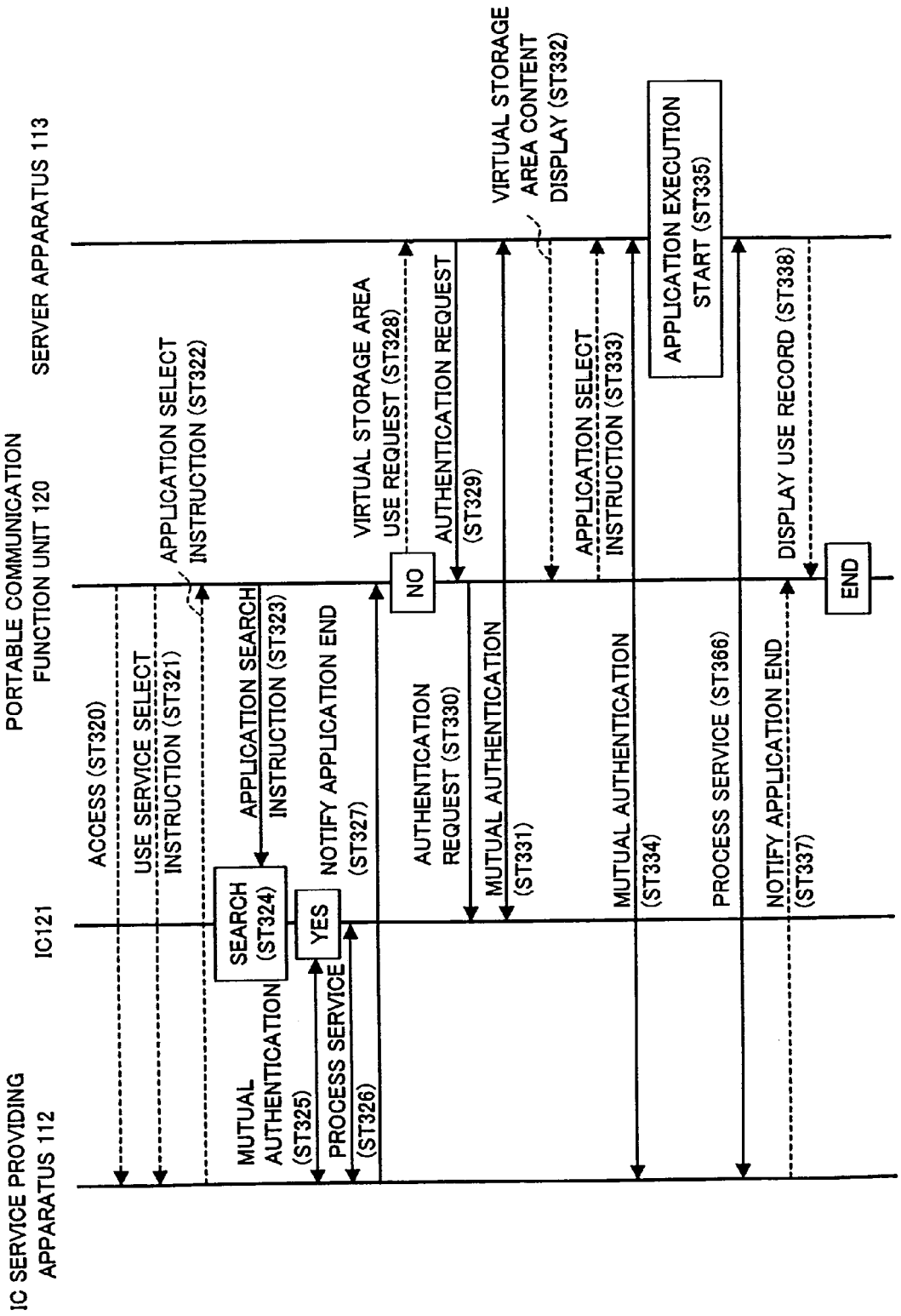
FIG. 23 is a chart explaining an example of the operation of the communication system illustrating a case of performing a process relating to a service using the IC by utilizing an application program stored in the virtual IC storage area server apparatus shown in FIG. 18 when a service provided by the IC service providing apparatus itself is automatically instructed to the virtual IC storage area server apparatus.

FIG. 23 is a chart for explaining the above exemplified operation.

Step ST320

The user A operates the operation unit 35 shown in FIG. 8 of the portable communication function unit 120 of the portable telephone apparatus 114, and in response to this operation, the control unit 38 shown in FIG. 8 access the IC service providing apparatus 112 through the wireless communication line 17, the gateway 10, and the network 18.

Step ST321:

The user A operates the operation unit 35, whereby in response to this operation, the control unit 38 transmits a use service select instruction for selecting and instructing a service to be used to the IC service providing apparatus 112.

Step ST322:

The control unit 133 of the IC service providing apparatus 112 shown in FIG. 19 generates an application select instruction that has specified an application program corresponding to the use service select instruction received at step ST321 and transmits the same to the portable communication function unit 120 of the portable telephone apparatus 114.

Step ST323:

The portable communication function unit 120 transmits a search instruction for the application program indicated by the application select instruction received at step ST322 to the IC 121.

The search instruction is received by the I/F unit 145 shown in FIG. 21.

Step ST324:

The control unit 148 of the IC 121 shown in FIG. 21 searches to check if the application program that became the target of the search instruction is stored in the memory 146 or not.

Then, when the control unit 148 judges that the application program is stored in the memory 146, proceeds to step ST325, while when it judges that the application program is not stored in the memory 146, proceeds to step ST328.

Step ST325:

When it has been judged that the application program is stored in the memory 146 by the search of step ST324, the IC 121 and the IC service providing apparatus 112 conduct mutual authentication.

Step ST326:

When one another's legitimacy is authenticated by the mutual authentication of step ST325, the control unit 148 shown in FIG. 21 executes the application program read from the memory 146, whereby the IC 121 and the IC service providing apparatus 112 performs the process relating to a service in collaboration with each other.

Step ST327:

When the processing of step ST326 ends, the control unit 133 of the IC service providing apparatus 112 shown in FIG. 19 generates an application end notification and transmits the same to the portable communication function unit 120 of the portable telephone apparatus 114.

Step ST328:

When it has been judged that the application program is not stored in the memory 146 by the search of step ST324, the portable communication function unit 120 of the portable telephone apparatus 114 generates a virtual storage area use request and transmits the same to the virtual IC storage area server apparatus 113.

Step ST329:

When the virtual IC storage area server apparatus 113 shown in FIG. 20 receives the virtual storage area use request at step ST328, based on a control of the control unit 153, the SAM 151 generates an authentication request and transmits the same to the portable communication function unit 120.

Step ST330:

When the portable communication function unit 120 receives the authentication request at step ST329, the control unit 38 generates an authentication request and transmits the authentication request to the IC 121 through the IC_I/F unit 36.

The IC 121 shown in FIG. 21 receives the authentication request from the portable communication function unit 120 by the I/F unit 45.

Step ST331:

The control unit 148 of the IC 121 conducts mutual authentication with the virtual IC storage area server apparatus 113 through the portable communication function unit 120 in response to the authentication request received at step ST330.

Step ST332:

When one another's legitimacy is authenticated by the mutual authentication of step ST331, the control unit 153 of the virtual IC storage area server apparatus 113 displays a content (content of a service) of a virtual storage area corresponding to the portable telephone apparatus 114 on the display unit 34 of the portable communication function unit 120.

Step ST333:

Based on the virtual storage area content displayed at step ST332, the user A selects a service for use by operating the operation unit 35. Due to this, the control unit 38 of the portable communication function unit 120 generates an application select instruction for instructing the selecting of an application program corresponding to the selected service, and transmits the same to the virtual IC storage area server apparatus 113.

Step ST334:

In response to the application select instruction of step ST333, the IC service providing apparatus 112 and the virtual IV storage area server apparatus 113 conduct mutual authentication through the network 18.

Step ST335:

When one another's legitimacy is authenticated by the mutual authentication of step ST334, the control unit 153 of the virtual IC storage area server apparatus 113 shown in FIG. 20 reads the application program determined by the application select instruction received at step ST333 from the memory 152 to start executing the same.

Step ST336:

The IC service providing apparatus 112 and the virtual IC storage area server apparatus 113 communicate with each other in response to the execution of the application program and perform a process relating to a service in collaboration with each other.

Step ST337:

When the processing of step ST336 ends, the IC service providing apparatus 112 notifies the portable communication function unit 120 the end of the application process.

Step ST338:

When the processing of step ST336 ends, the virtual IC storage area server apparatus 113 displays a use record thereof and a use record of the service on the display unit 34 of the portable communication function unit 120.

An exemplified example of the communication system 101 of a case of registering (secure) the IC virtual storage area 60a used by the IC 121 of the portable telephone apparatus 114 in a storage area of the memory 152 of the virtual IC storage area server apparatus 113 shown in FIG. 20 is the same as the case shown in FIG. 15 except for the point that communication is conducted between the IC 121, the portable communication function unit 120, and the virtual IC storage area server apparatus 113.

Below, an explanation will be given of an example of the operation illustrating a case of registering the application program 65a in the IC virtual storage area 60a allocated to the portable telephone apparatus 114 in the above operation when the portable communication function unit 120 does not conduct confirmation for an available space in the IC virtual storage area 60a.

Figure 24:
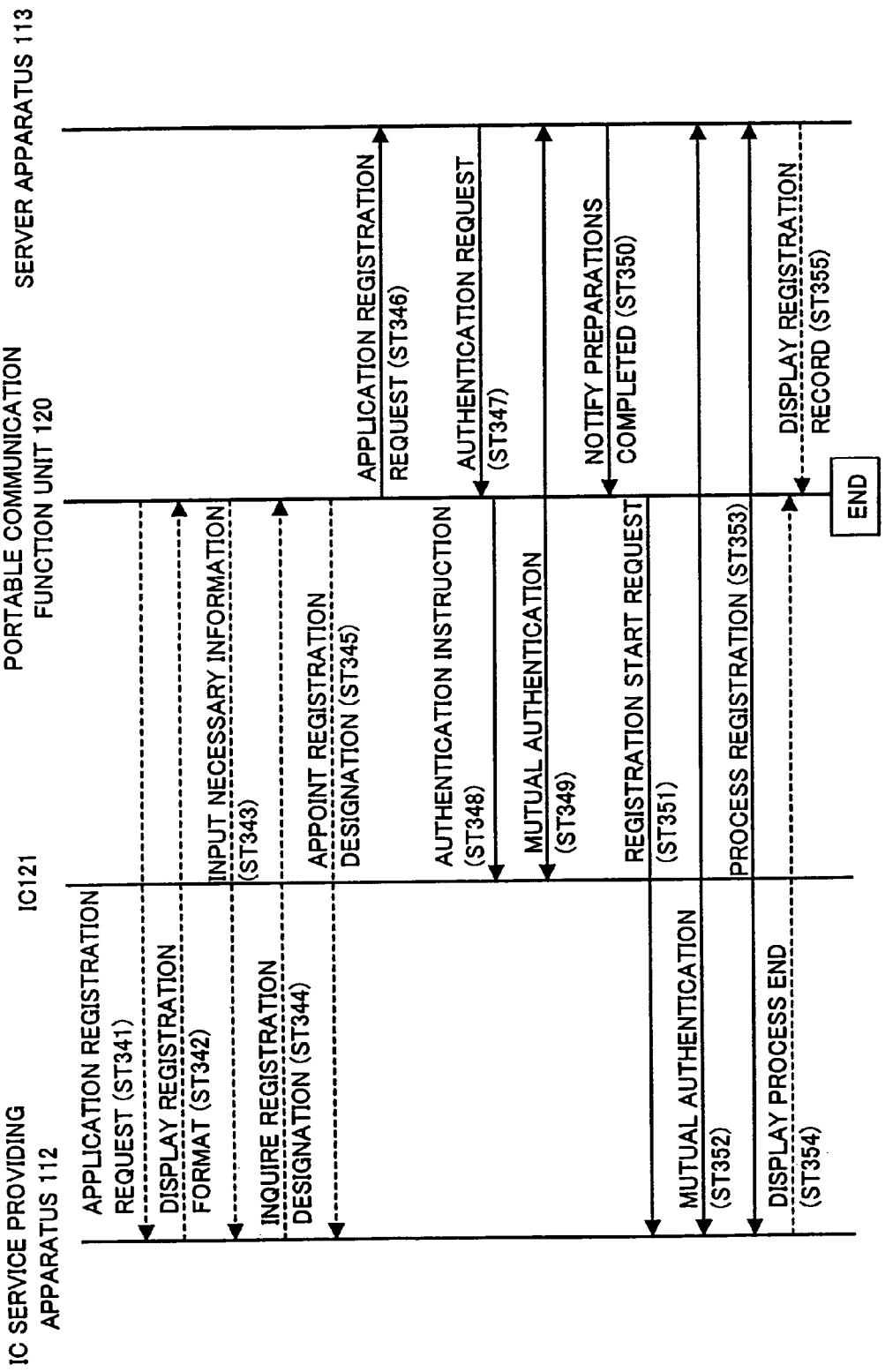
FIG. 24 is a chart explaining an example of the operation illustrating a case of registering an application program in the IC virtual storage area allocated to the portable telephone apparatus in the third exemplified operation when a portable communication function unit does not conduct confirmation for an available space in the IC virtual storage area.

FIG. 24 is a chart for explaining the above operation.

Step ST341:

The user A operates the operation unit 35 shown in FIG. 8 of the portable communication function unit 120 of the portable telephone apparatus 114, and in response to the operation, the control unit 38 shown in FIG. 8 generates an application program register request and transmits the same to the IC service providing apparatus 112.

Step ST342:

When the IC service providing apparatus 112 receives the application register request at step ST341, it displays a registration format of the application program on the display unit 34 shown in FIG. 8 of the portable communication function unit 120.

Step ST343:

The user A operates the operation unit 35 shown in FIG. 8 of the portable communication function unit 120 of the portable telephone apparatus 114 to input information required for registration of the application program, and the inputted information is transmitted to the IC service providing apparatus 112.

Step ST344:

The IC service providing apparatus 112 inquires the portable communication function unit 120 a designation for registering the application program.

Step ST345:

In response to the inquiry received at step ST344, the portable communication function unit 120 transmits to the IC service providing apparatus 112 a register destination designation indicating the virtual IC storage area server apparatus 113 (if necessary, IC virtual storage area 60a) for registering an application program.

Step ST346:

The portable communication function 120 of the portable telephone apparatus 114 generates an application register request requesting registration of the application program to the virtual IC storage area server apparatus 113 and transmits the same to the IC storage area server apparatus 113.

Step ST347:

When the virtual IC storage area server apparatus 113 shown in FIG. 20 receives the application register request at step ST346, based on a control of the control unit 153, the SAM 151 generates an authentication request and transmits the same to the portable communication function unit 120.

Step ST348:

When the portable communication function unit 120 receives the authentication request at step ST347, the control unit 38 generates an authentication request and transmits the authentication request to the IC 121 through the IC_I/F unit 36. The IC 121 shown in FIG. 21 receives the authentication request from the portable communication function unit 120 by the I/F unit 45.

Step ST349:

The control unit 148 of the IC 121 conducts mutual authentication with the virtual IC storage area server apparatus 113 through the portable communication function unit 120 in response to the authentication request received at step ST348.

Step ST350:

When one another's legitimacy is authenticated by the mutual authentication of step ST349, the control unit 153 of the virtual IC storage area server apparatus 113 notifies the portable communication function unit 120 that preparation for registering the application is completed.

Step ST351:

The portable communication function unit 120 generates a registration start request requesting the start of registering the application program on the basis of the notification of step ST350 and transmits the same to the IC service providing apparatus 112.

Step ST352:

The IC service providing apparatus 112 and the virtual IC storage area server apparatus 113 conduct mutual authentication.

Step ST353:

When one another's legitimacy is authenticated by the mutual authentication of step ST352, the IC service providing apparatus 112 and the virtual IC storage area server apparatus 113 communicate with each other and perform a registration process of the application program 65a.

Specifically, the application program 65a is transmitted from the IC service providing apparatus 112 to the virtual IC storage area server apparatus 113, whereby the application program 65a is written in the memory 152 of the virtual IC storage area server apparatus 113.

Step ST354:

When the processing of step ST353 ends, the IC service providing apparatus 112 notifies the portable communication function unit 120 through the IC 121 that the application registration process has ended.

Step ST355:

When the processing of step ST353 ends, the virtual IC storage area server apparatus 113 notifies the portable communication function unit 120 through the IC 121 that the application registration process has ended. As a result, the portable communication function unit 120 ends the application registration process.

Below, an explanation is given of an example of an operation illustrating a case of registering the application program 65a in the IC virtual storage area 60a allocated to the portable telephone apparatus 114 in the above third exemplified operation when the portable communication function unit 120 conducts confirmation of available space in the IC virtual storage area 60a.

Figure 25:
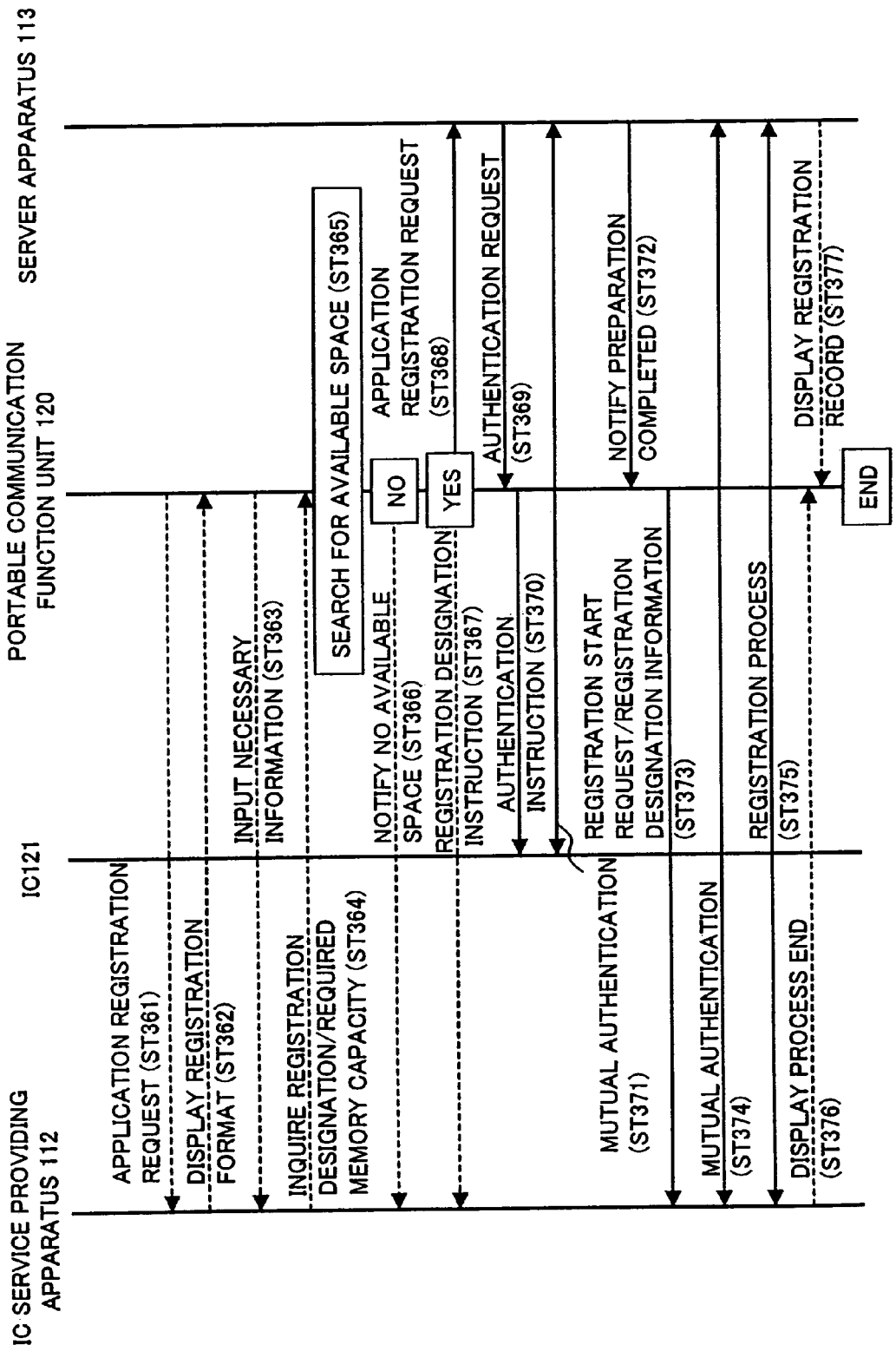
FIG. 25 is a chart explaining an example of the operation illustrating a case of registering an application program in the IC virtual storage area allocated to the portable telephone apparatus in the third exemplified operation when the portable communication function unit conducts confirmation of available space in the IC virtual storage area.

FIG. 25 is a chart explaining the above operation. The processing of steps ST361 to ST363 shown in FIG. 25 are the same as those of steps ST341 to ST343 shown in FIG. 24. Further, the processing of steps ST368 to ST377 shown in FIG. 25 are the same as those of steps ST346 to ST355 shown in FIG. 24.

In the process shown in FIG. 25, the IC service providing apparatus 112 transmits the registration designation inquiry together with a required memory capacity for storing the application program to be registered to the portable communication function unit 120 (Step ST364).

Next, the portable communication function unit 120 searches the IC virtual storage area 60a of the virtual IC storage area server apparatus 113 to check if there is the required available space or not (Step ST365).

Then, when there is no available space, the IC service providing apparatus 112 is notified from the portable communication function unit 120 that there is no available space (Step ST366).

On the other hand, when there is available space, an application register request is outputted from the portable communication function unit 120 to the virtual IC storage area server apparatus 113 (Step ST368), and a register destination designation indicating the virtual IC storage area server apparatus 113 is transmitted to the IC service providing apparatus 112 from the portable communication function unit 120 (Step ST367).

As explained above, in the communication system 101, even though there is a limit in the storage capacity of the memory 146 of the IC 121 shown in FIG. 18 and FIG. 19, by storing in the virtual IC storage area server apparatus 113 the application program relating to a service performed using the data carrier function and/or the individual authentication function built into a chip of the IC 121 and the virtual IC storage area server apparatus 113 executing the same, a variety of services can be provided using the IC 121 provided with a comparatively small size memory. Further, in this case, an application program need not be downloaded from the virtual IC storage area server apparatus 113 to the IC 121 because communication based on the application program is performed between the IC service providing apparatus 112 and the virtual IC storage area server apparatus 113. In other words, a plurality of services performed using a plurality of applications can be provided using the IC 121 alone.

Further, according to the communication system 101, after the IC 121 and the virtual IC storage area server apparatus 113 have performed mutual authentication, and the IC service providing apparatus 112 and the virtual IC storage area server apparatus 113 have performed mutual authentication, in order for the virtual IC storage area server apparatus 113 executing an application program and the IC service providing apparatus 112 to execute the process relating to a service in collaboration with each other, illicit access can be prevented.

An effect of the above-mentioned communication system 101 is realized by the configuration and operation of the IC 121 built into the aforementioned portable telephone apparatus 114.

Further, according to the IC 121 built into the portable telephone apparatus 114, as shown in FIG. 21, providing the I/F unit 145 for communicating with the portable communication function unit 120 enabled the portable communication function unit 120 and the IC 121 to mutually control each other. Therefore, for example, the portable communication function unit 120 is capable of disabling the IC 21 and the IC 121 is capable of disabling the portable communication function unit 120 under a constant condition, whereby various controls can be realized from the viewpoint of a content and security of a service.

It should be appreciated that the present invention is not limited to the above explained embodiments. Although cases in which the ICs 21 and 121 built into the portable telephone apparatuses 14 and 114 were exemplified in the above explained embodiments, the present invention is applicable to a fixed telephone connected to fixed line, a portable information terminal (Personal Digital Assistants), that is, a compact information equipment, a clock, a computer, etc., and even to a case in which the ICs 21 or 121 is built into equipment having the capability of being able to be connected to a network by either the wired or wireless system.

Further, the ICs 21 and 121 may be detachably built into the communication apparatus or non-detachably built therein. IC cards having the ICs 21 and 121 built therein or a memory card or other external storage mediums may be detachably configured in a portable telephone apparatus, a portable information terminal, a computer or the like.

As explained above, according to the present invention, a communication method and a system of the same, a communication apparatus, a processing apparatus and a method of the same capable of providing a variety of services by using a single integrated circuit without limitations placed on the storage capacity of the memory built into the integrated circuit can be provided.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A service providing method wherein a communication apparatus and a processing apparatus communicate with each other in response to a service use request issued from the communication apparatus to provide a service to a user of the communication apparatus, comprising the steps of:
   performing communication between a server apparatus storing a program defining a process relating to the service and the communication apparatus to judge if use of the program is permitted or not in response to the service use request;
   executing the program by the server apparatus when use of the program is permitted; and
   performing communication between the server apparatus and the processing apparatus through the communication apparatus in response to the execution of the program by the server apparatus to provide the service to said user.

2. A service providing method as set forth in claim 1, wherein the server apparatus stores the program relating to the service to be provided to a user of the communication apparatus in a storage area allocated in advance to the communication apparatus.

3. A service providing method as set forth in claim 2, wherein the communication apparatus transmits the service use request, which indicates the use of the storage area allocated in advance to the communication apparatus, to the server apparatus.

4. A service providing system comprising:
   a communication apparatus;
   a processing apparatus that transfers data with the communication apparatus and used in a service to a user of the communication apparatus; and
   a server apparatus that stores a program defining a process relating to the service, wherein the server apparatus and the communication apparatus communicate with each other in response to a service use request issued from the communication apparatus to judge if use of the program is permitted or not,
   the server apparatus executes the program when use of the program is permitted; and
   the server apparatus and said processing apparatus communicate with each other through the communication apparatus in response to the execution of the program by the server apparatus to provide the service to the user.

5. A server apparatus communicating with a communication apparatus and a processing apparatus that transfers data with the communication apparatus and used in a service to a user of the communication apparatus, comprising:
   a storing device for storing a program defining a process relating to the service;
   a receiving device for receiving a service use request from the communication apparatus;
   an authentication device for authenticating if the service use request is legitimate or not; and
   when it is judged that the service use request is legitimate, a controlling device for reading a program defining a process relating to the service from the storing device, executing the read program, and while communicating with the processing apparatus through the communication apparatus, performing a process for providing a service to the user in collaboration with the processing apparatus in response to the execution of the program.

6. A communication method performed by a server apparatus to communicate with a communication apparatus and a processing apparatus that transfers data with the communication apparatus and used in a service to a user of the communication apparatus, comprising the steps of:
   authenticating if the service use request is legitimate or not when a service use request is received from the communication apparatus;
   reading a program defining a process relating to the service from said storing device when judged that the service use request is legitimate; and
   executing the read program while communicating with the processing apparatus through the communication apparatus in response to the execution of the program, performing a process for providing a service to the user in collaboration with the processing apparatus.

7. A communication method performing communication using a first communication apparatus including an integrated circuit and a communication circuit, and a processing apparatus that transfers data with the integrated circuit and used in service relating to the integrated circuit, comprising the steps of:
   transmitting by the integrated circuit a use request of said program through the communication circuit to a second communication apparatus storing a program defining a process relating to the service and executing the same; and
   executing by the second communication apparatus a program relating to the use request when it is judged that the use request is legitimate while the integrated circuit relays communication between the processing apparatus and the second communication apparatus conducted through the communication circuit, performing by the processing apparatus and the second communication apparatus a process relating to the service in collaboration with each other in response to the execution of the program by the second communication apparatus.

8. A communication method as set forth in claim 7, further comprising a step of storing the program relating to the first communication apparatus in a storage area allocated in advance to the first communication apparatus among storage areas in the second communication apparatus.

9. A communication method as set forth in claim 7, further comprising a step of transmitting the use request, which indicates use of the storage area allocated in advance to the first communication apparatus, to the second communication apparatus.

10. A communication method as set forth in claim 7, further comprising the steps of:
transmitting from the first communication apparatus to the second communication apparatus, a program select instruction specifying a program to be selected and used after the integrated circuit transmits the use request to the second communication apparatus; and
reading and executing a program specified by the program select instruction using the second communication apparatus.

11. A communication method as set forth in claim 7, further comprising the steps of:
outputting the program select instruction, which specifies the program to be selected and used from the processing apparatus, to the integrated circuit;
transmitting the use request together with the program select instruction from the integrated circuit to the second communication apparatus; and
selecting and executing a program specified by the program select instruction second communication apparatus.

12. A communication method as set forth in claim 7, further comprising the steps of:
conducting mutual authentication with the processing apparatus and the second communication apparatus when the integrated circuit receives a use permission instruction confirming the legitimacy of the processing apparatus and the second communication apparatus, wherein the processing apparatus and the second communication apparatus communicate through the integrated circuit and the communication circuit to perform a process relating to the service in collaboration with each other.

13. A communication method as set forth in claim 7, further comprising the steps of:
transmitting from the first communication apparatus to the second communication apparatus a storage area allocation request requesting that the entire or at least a portion of the storage area in the second communication apparatus is to be allocated for use for the first communication apparatus; and
allocating a storage area to the first communication apparatus using the second communication apparatus in response to the storage area allocation request.

14. A communication method as set forth in claim 7, further comprising the steps of:
transmitting intrinsic data of the integrated circuit through the communication circuit to the second communication apparatus after the integrated circuit and the second communication apparatus have authenticated one another's legitimacy; and
managing the intrinsic data and the storage area allocated to the first communication apparatus.

15. A communication method as set forth in claim 7, wherein:
the first communication apparatus is a portable type communication apparatus;
the communication circuit is a wireless communication circuit performing communication using a wireless communication network;
the second communication apparatus is connected to a network; and
the integrated circuit communicates with the second communication apparatus through the communication circuit, the wireless communication network, and the network.

16. A communication method as set forth in claim 7, wherein the integrated circuit comprises a first interface for transferring data with the processing apparatus and a second interface for transferring data with the communication circuit.

17. A communication method as set forth in claim 7, wherein the integrated circuit is a tamper-resistant circuit.

18. A communication system comprising:
a first communication apparatus including an integrated circuit and a communication circuit;
a processing apparatus that transfers data with the integrated circuit and is used in a service relating to the integrated circuit; and
a second communication apparatus that stores a program defining a process relating to the service and executes the same, wherein the integrated circuit transmits the program use request through the communication circuit to the second communication apparatus, and wherein the second communication apparatus executes a program relating to the use request after it has been judged that the use request is legitimate, while the integrated circuit relays communication between the processing apparatus and the second communication apparatus conducted through the communication circuit, the processing apparatus and the second communication apparatus perform a process relating to the service in collaboration with each other in response to the execution of the program by the second communication apparatus.

19. A communication apparatus communicating with another communication apparatus comprising an integrated circuit and a communication circuit, and a processing apparatus that transfers data with the integrated circuit and used in a service relating to the integrated circuit, comprising:
a storage device means for storing a program defining a process relating to the service;
a receiving device for receiving a program use request from the integrated circuit through the communication circuit;
an authentication device for authenticating if the use request is legitimate or not; and
when it is judged that the use request is legitimate, a controlling device for reading a program defining a process relating to the service from the storage device, executing the read program, and communicating with the processing apparatus through the communication circuit and the integrated circuit and performing a process relating to the service in collaboration with the processing apparatus in response to the execution of the program.

20. A communication apparatus as set forth in claim 19, wherein among a plurality of storage areas of the storage device, the program relating to the communication apparatus is stored in a storage area allocated in advance to the communication apparatus.

21. A communication apparatus as set forth in claim 19, wherein:
the receiving device receives, from the another communication apparatus, the use request indicating that the storage area allocated in advance to the another communication apparatus will be used; and
the controlling device transmits to the integrated circuit the use permit instruction indicating that use of the storage area by the another communication apparatus is permitted when judged that the use request is legitimate.

22. A communication apparatus as set forth in claim 19, wherein:
the receiving means receives a storage area allocation request requesting that the entire or at least a portion of the storage area of the storage device be allocated for use to the another communication apparatus; and
the controlling device allocates a storage area to the another communication apparatus in response to the storage area allocation request.

23. A communication apparatus as set forth in claim 19, wherein:
the receiving means device intrinsic data of the integrated circuit from the integrated circuit through the communication circuit after the authentication device authenticates with the integrated circuit one another's legitimacy; and
the controlling device manages the intrinsic data and the storage area allocated to the another communication apparatus.

24. A communication apparatus as set forth in claim 19, wherein:
the another communication apparatus is a portable type communication apparatus;
the communication circuit is a wireless communication circuit performing communication using a wireless communication network; and
a transmitting means and the receiving means transfers a request and data through a network.

25. A communication method wherein a communication apparatus comprising an integrated circuit and a communication circuit communicates with a processing apparatus that transfers data with the integrated circuit and used in a service relating to the integrated circuit, comprising the steps of:
receiving a use request of a program from the integrated circuit through the communication circuit;
reading an application program relating to the use request from a storage device;
executing the read program; and
communicating with the processing apparatus through the communication circuit and the integrated circuit in response to the execution of the program and performing a process relating to the service in collaboration with the processing apparatus.

26. A processing apparatus that transfers data with a first communication apparatus and used in a service provided to a user of the first communication apparatus, wherein,
after a second communication apparatus storing a program defining a process relating to the service and executing the same, and the first communication apparatus have authenticated one another's legitimacy by a mutual authentication conducted through the communication circuit, the processing apparatus, while communicating with the second communication apparatus through the first communication apparatus, performs a process relating to the service in collaboration with the second communication apparatus.

27. A processing apparatus as set forth in claim 26, wherein in response to a use request of the program from the first communication apparatus to the second communication apparatus, the processing apparatus transmits, to the second communication apparatus through the first communication apparatus, an instruction selecting a program relating to the service to be executed by the second communication apparatus when use permission is received from the second communication apparatus through the first communication apparatus.

28. An integrated circuit access apparatus transferring data between an integrated circuit built into a first communication apparatus and a processing apparatus used in a service provided to a user of the first communication apparatus, wherein
after a second communication apparatus storing a program defining a process relating to the service and executing the same, and the first communication apparatus have authenticated one another's legitimacy by a mutual authentication conducted through the communication circuit, transfers data between the integrated circuit and the processing apparatus to relay communication between the second communication apparatus and the processing apparatus performed through the integrated circuit.

29. A processing method transferring data with a first communication apparatus comprising an integrated circuit and a communication circuit and used in a service relating to the integrated circuit, comprising the steps of:
conducting mutual authentication of a second communication apparatus storing a program defining a process relating to the service and executing the same, and the integrated circuit through the communication circuit, and after one another's legitimacy is authenticated by the mutual authentication;
relaying the integrated circuit; and
while communicating with the second communication apparatus executing the program, performs a process relating to the service in collaboration with the second communication apparatus.

30. A communication method performing communication using a first communication apparatus comprising an integrated circuit and a communication circuit, a second communication circuit used in a service relating to the integrated circuit, and a third communication apparatus storing a program defining a process relating to the integrated circuit and executing the same, comprising the steps of:
transmitting a use request of the program from the integrated circuit to the third communication apparatus through the communication circuit;
conducting mutual authentication between the integrated circuit and the third communication apparatus through the communication circuit; and
conducting mutual authentication between the second communication apparatus and the third communication apparatus when the legitimacy of the integrated circuit and the third communication apparatus has been authenticated by the mutual authentication thereof, and
when the second communication apparatus and the third communication apparatus have authenticated one another's legitimacy by the mutual authentication,
executing by the third communication apparatus the program relating to the use request, whereby the second communication apparatus and the third communication apparatus communicate to perform a process relating to the service in collaboration with each other in response to the execution of the program.

31. A communication method as set forth in claim 30, further comprising the steps of:
transmitting from the second communication apparatus to the first communication apparatus a program select instruction for instructing a program to be selected and used;
transmitting by the first communication apparatus on the basis of the program select instruction a program select instruction to the third communication instruction; and executing by the third communication apparatus a program specified by the program select instruction received from the first communication apparatus.

32. A communication method as set forth in claim 30, further comprising the steps of:
   transmitting from the second communication apparatus to the first communication apparatus a program select instruction for instructing a program to be selected and used;
   judging by the integrated circuit if a program to be used in a service performed using the second communication apparatus is stored or not in response to the program select instruction;
   when the integrated circuit judges the program is stored, executing by the integrated circuit the program, and performing a process relating to the service by the integrated circuit and the second communication apparatus in collaboration with each other in response to the execution of the program; and
   when the integrated circuit judges the program is not stored, transmitting by the first communication apparatus a program select instruction to the third communication apparatus, executing by the third communication apparatus a program specified by a program select instruction received from the first communication apparatus, and performing a process relating to the service by the second communication apparatus and the third communication apparatus in collaboration with each other in response to the execution of the program.

33. A communication method as set forth in claim 30, wherein:
   the first communication apparatus is a portable type communication apparatus;
   the communication circuit is a wireless communication circuit performing communication using a wireless communication network;
   the second communication apparatus and third communication apparatus are connected to a network;
   the integrated circuit communicates with the second communication apparatus and the third communication apparatus through the communication circuit, the wireless communication network, and the network; and
   the second communication apparatus and the third communication apparatus communicate through the network.

34. A communication system comprising:
   a first communication apparatus comprising an integrated circuit and a communication circuit;
   a second communication apparatus used in a service relating to the integrated circuit; and
   a third communication apparatus storing a program defining a process relating to the service and executing the same, wherein:
   a use request of the program is transmitted from the integrated circuit to the third communication apparatus through the communication circuit;
   mutual authentication is conducted between the integrated circuit and the third communication apparatus through the communication circuit;
   when the integrated circuit and the third communication apparatus have authenticated one another's legitimacy by the mutual authentication, the second communication apparatus and the third communication apparatus conducts mutual authentication; and
   when the second communication apparatus and the third communication apparatus have authenticated one another's legitimacy by the mutual authentication, the third communication apparatus executes the program relating to the use request, and the second communication apparatus and the third communication apparatus communicate in response to the execution of the program to perform a process relating to the service in collaboration with each other.

35. A communication apparatus communicating with a first communication apparatus comprising an integrated circuit and a communication circuit, and a second communication apparatus storing a program defining a process relating to a service and used in a service relating to the integrated circuit, comprising:
   an authentication device for authenticating with the second communication apparatus after the integrated circuit and the second communication apparatus have authenticated one another's legitimacy by a mutual authentication; and
   a control device for communicating with the second communication apparatus executing the program to perform a process relating to the service in collaboration with each other after one another's legitimacy with the second communication apparatus has been authenticated by a mutual authentication through the authentication device.

36. A communication method performed between a first communication apparatus including an integrated circuit and a communication circuit, and a second communication apparatus storing a program defining a process relating to a service to be provided using the integrated circuit and executing the same, comprising the steps of:
   conducting mutual authentication with the second communication apparatus after the integrated circuit and the second communication apparatus have authenticated one another's legitimacy by a mutual authentication; and
   communicating with the second communication apparatus executing the program to perform a process relating to the service in collaboration with each other after one another's legitimacy with the second communication apparatus has been authenticated by the mutual authentication with the second communication apparatus.

37. A communication apparatus communicating with a first communication apparatus including an integrated circuit and a communication circuit, and a second communication apparatus used in a service relating to the integrated circuit, comprising:
   a storage device for storing a program defining a process relating to the service;
   a receiving device for receiving a use request of the program from the integrated circuit through the communication circuit;
   an authentication device for conducting mutual authentication with the integrated circuit through the communication circuit in response to the use request and after one another's legitimacy has been authenticated by the mutual authentication, conducting mutual authentication with the second communication apparatus; and
   when one another's legitimacy with the second communication apparatus has been authenticated by the mutual authentication, a controlling means for reading the program relating to the use request from the storing means and executing the same, and communicating with the second communication apparatus in response to the execution of the program to perform a process relating to the service in collaboration with each other.

38. A communication method wherein a first communication apparatus comprising an integrated circuit and a communication circuit, and a second communication apparatus used in a service relating to the integrated circuit communicates, comprising the steps of:

receiving a use request of a program defining a process relating to the service from the integrated circuit through the communication circuit;

conducting mutual authentication with the integrated circuit through the communication circuit in response to the use request, and after one another's legitimacy has been authenticated by the mutual authentication, conducting mutual authentication with the second communication apparatus;

reading a program relating to the use request from a storage device and executing the same when one another's legitimacy with the second communication apparatus has been authenticated by the mutual authentication; and communicating with the second communication apparatus in response to the execution of the program to perform a process relating to the service in collaboration with each other.

* * * * *